(12) United States Patent
Steinberg et al.

(10) Patent No.: US 7,676,110 B2
(45) Date of Patent: *Mar. 9, 2010

(54) DETERMINATION OF NEED TO SERVICE A CAMERA BASED ON DETECTION OF BLEMISHES IN DIGITAL IMAGES

(75) Inventors: Eran Steinberg, San Francisco, CA (US); Yury Prilutsky, San Mateo, CA (US); Peter Corcoran, Claregalway (IE); Petronel Bigioi, Galway (IE); Adrian Zamfir, Bucharest (RO); Vasile Buzuloiu, Bucharest (RO); Danutz Ursu, Bucharest (RO); Marta Zamfir, Bucharest (RO)

(73) Assignee: FotoNation Vision Limited, Galway (IE)

( * ) Notice: Subject to any disclaimer, the term of this patent is extended or adjusted under 35 U.S.C. 154(b) by 1242 days.

This patent is subject to a terminal disclaimer.

(21) Appl. No.: 10/676,820

(22) Filed: Sep. 30, 2003

(65) Prior Publication Data
US 2005/0078173 A1  Apr. 14, 2005

(51) Int. Cl.
*H04N 7/14* (2006.01)
(52) U.S. Cl. .................... 382/275; 348/14.12; 348/241; 348/372
(58) Field of Classification Search .............. 348/14.12, 348/241–372; 382/275
See application file for complete search history.

(56) References Cited

U.S. PATENT DOCUMENTS

| | | | |
|---|---|---|---|
| 5,065,257 A | 11/1991 | Yamada | 358/463 |
| 5,214,470 A | 5/1993 | Denber | 355/75 |
| 5,216,504 A * | 6/1993 | Webb et al. | 348/190 |
| 5,315,538 A | 5/1994 | Borrell et al. | |
| 5,416,516 A | 5/1995 | Kameyama et al. | 348/246 |
| 5,436,979 A | 7/1995 | Gray et al. | 382/141 |
| 5,576,715 A | 11/1996 | Litton et al. | |
| 5,625,413 A | 4/1997 | Katoh et al. | 348/246 |
| 5,965,896 A | 10/1999 | Marton | |
| 5,969,372 A | 10/1999 | Stavely et al. | 250/559.42 |
| 5,974,194 A | 10/1999 | Hirani et al. | 382/262 |
| 6,002,436 A * | 12/1999 | Anderson | 348/372 |
| 6,035,072 A | 3/2000 | Read | 382/275 |
| 6,125,213 A | 9/2000 | Morimoto | 382/263 |

(Continued)

FOREIGN PATENT DOCUMENTS

WO    03/019473    *    3/2003

(Continued)

OTHER PUBLICATIONS

Patent Abstract of Japan, publication No. 2000050062, Image Input Device, publication date Feb. 18, 2000, 1 page.

*Primary Examiner*—Charles Kim
*Assistant Examiner*—John W Lee
(74) *Attorney, Agent, or Firm*—Andrew V. Smith

(57) ABSTRACT

A method of automatically determining a need to service a digital image acquisition system including a digital camera with a lens assembly includes analyzing pixels within one or more acquired digital images according to probability determinations that such pixels correspond to blemish artifacts. It is automatically determined whether a threshold distribution of blemish artifacts is present within one or more of the digital images. A need for service is indicated when at least the threshold distribution is determined to be present.

21 Claims, 22 Drawing Sheets

U.S. PATENT DOCUMENTS

| | | | |
|---|---|---|---|
| 6,233,364 B1 | 5/2001 | Krainiouk et al. | 382/275 |
| 6,266,054 B1 | 7/2001 | Lawton et al. | 345/326 |
| 6,465,801 B1 | 10/2002 | Gann et al. | 250/559.4 |
| 6,487,321 B1 | 11/2002 | Edgar et al. | 382/260 |
| 6,587,592 B2 | 7/2003 | Georgiev et al. | 382/254 |
| 6,707,950 B1 | 3/2004 | Burns et al. | |
| 6,792,161 B1 | 9/2004 | Imaizumi et al. | |
| 6,940,550 B2 | 9/2005 | Kitawaki et al. | |
| 7,003,136 B1 | 2/2006 | Harville | |
| 7,061,648 B2 * | 6/2006 | Nakajima et al. | 358/1.9 |
| 2001/0035491 A1 | 11/2001 | Ochiai et al. | 250/208.1 |
| 2001/0039804 A1 * | 11/2001 | Newman et al. | 62/66 |
| 2001/0041018 A1 | 11/2001 | Sonoda | 382/275 |
| 2002/0093577 A1 * | 7/2002 | Kitawaki et al. | 348/241 |
| 2002/0154831 A1 | 10/2002 | Hansen et al. | 382/257 |
| 2002/0158192 A1 | 10/2002 | Gann | 250/234 |
| 2002/0195577 A1 | 12/2002 | Gann et al. | 250/559.48 |
| 2003/0036860 A1 * | 2/2003 | Rice et al. | 702/57 |
| 2003/0039402 A1 | 2/2003 | Robins et al. | 382/275 |
| 2003/0118249 A1 | 6/2003 | Edgar | 382/275 |
| 2003/0133027 A1 | 7/2003 | Itoh | 348/246 |
| 2003/0174902 A1 * | 9/2003 | Barkan | 382/274 |

FOREIGN PATENT DOCUMENTS

| | | | |
|---|---|---|---|
| WO | 03/019473 A1 * | 3/2003 | |
| WO | WO 03/019473 A1 | 3/2003 | |

* cited by examiner

DETERMINATION OF NEED TO SERVICE A CAMERA BASED ON DETECTION OF BLEMISHES IN DIGITAL IMAGES

CROSS-REFERENCE TO RELATED APPLICATIONS

This application is related to a family of patent applications filed on the same day by the same inventors including those entitled: (1) Automated Statistical Self-Calibrating Detection and Removal of Blemishes in Digital Images Based On Multiple Occurrences Of Dust In Images, filed Sep. 30, 2003, application Ser. No. 10/676,823; (2) Automated Statistical Self-Calibrating Detection and Removal of Blemishes in Digital Images Based on a Dust Map Developed From Actual Image Data, filed Sep. 30, 2003, application Ser. No. 10/677,134; (3) Automated Statistical Self-Calibrating Detection and Removal of Blemishes in Digital Images Dependent Upon Changes in Extracted Parameter Values, filed Sep. 30, 2003, application Ser. No. 10/677,139; (4) Automated Statistical Self-Calibrating Detection and Removal of Blemishes in Digital Images Based on Determining Probabilities Based On Image Analysis Of Single Images, filed Sep. 30, 2003, application Ser. No. 10/677,140; (5) Determination Of Need To Service A Camera Based On Detection of Blemishes in Digital Images, filed Sep. 30, 2003, application Ser. No. 10/676,820; (6) Method Of Detecting and Correcting Dust in Digital Images Based On Aura And Shadow Region Analysis, filed Sep. 30, 2003, application Ser. No. 10/676,845; (7) Digital Camera, filed Sep. 30, 2003, application Ser. No. 10/676,716; and (8) Digital Image Acquisition And Processing System, filed Sep. 30, 2003, application Ser. No. 10/676,835, which are all hereby incorporated by reference.

BACKGROUND

1. Field of the Invention

This invention related to digital photography and in particular, automated means of removing blemish artifacts from images captured and digitized on a digital process.

2. Description of the Related Art

Many problems are caused by dust in particular and blemishes in general on imaging devices in general and digital imaging devices in particular. In the past, two distinct forms of image processing included providing means to detect and locate dust, scratches or similar defects and providing means to remedy the distortions caused by the defects to an image. It is desired to have an advantageous system that combines these functions, and can automatically detect and correct for the effects of dust, scratches and other optical blemishes.

Dust has been a problem in scanning devices for a long time. Various aspects of the scanning process, enhanced by image processing techniques where appropriate, have been employed to provide means for the detection of dust or defects relating to document or image/film scanners. These devices form an image by moving a 1D sensor pixel array across a document platen, or in some cases, the document platten, with document/image is moved in under the sensor array. The physics and implementation of these devices differ significantly from those of a field-based sensor or camera-style device. It is desired particularly to have dust and/or blemish detection and correction techniques for field-based or camera-style acquisition devices.

Image correction has been studied in relation to display devices, output apparatuses such as printers, and digital sensors. Image correction of dust artifacts can be used to recreate missing data, also referred to as in-painting or restoration, or undoing degradation of data, which still remains in the image, also referred to as image enhancement. It is desired to have a system including a digital camera and an external device or apparatus that can facilitate a defect detection and/or correction process involving sophisticated and automated computerized programming techniques.

SUMMARY OF THE INVENTION

A method of automatically determining a need to service a digital image acquisition system including a digital camera with a lens assembly is provided in accordance with a first aspect of the invention. The method includes analyzing pixels within one or more acquired digital images according to probability determinations that such pixels correspond to blemish artifacts. It is automatically determined whether a threshold distribution of blemish artifacts is present within one or more of the digital images. A need for service is indicated when at least the threshold distribution is determined to be present.

The one or more acquired images may include one or more calibration images. The threshold distribution may be determined based upon an analysis of the ability of an automatic blemish correction module of the digital image acquisition system to reasonably correct such blemishes within the images.

The method may further include determining probabilities of dust artifact regions corresponding to the pixels within the digitally-acquired image, associating the dust artifact regions with one or more extracted parameters relating to the lens assembly when the image was acquired, forming a statistical record including dust artifact regions based on the dust artifact determining and associating, and determining a threshold distribution based on predetermined characteristics of the statistical record. Size or shape, or both, of the dust artifact regions may be included within the predetermined characteristics. The indicating may include notifying a user, based on the determination of whether the threshold distribution is present, that the digital camera needs to be serviced.

The one or more acquired images may be acquired with specific acquisition settings including aperture, shutter speed, sensitivity, or subject matter, or combinations thereof. The specific acquisition settings may be automatically determined in a specific calibration mode on the digital image acquisition system. The analyzing of the pixels may be based on a defined time interval since the last analyzing. The analyzing of the pixels may be defined based on a relationship with a change of lenses.

A method of automatically determining the need to service a digital image acquisition system including a digital camera with a lens assembly is provided in accordance with a second aspect of the invention. The method comprises acquiring multiple original digital images with the digital acquisition device. Probabilities that certain pixels correspond to dust artifact regions within the images are determined based at least in part on a comparison of suspected dust artifact regions within two or more of the images. A statistical dust record is formed including probabilities of dust artifact regions based on the dust artifact determining and associating. A need for service is determined when the statistical dust record indicates that a predetermined threshold dust artifact distribution is present within digital images acquired with the digital acquisition device.

A method of automatically determining the need to service a digital image acquisition system including a digital camera with a lens assembly is further provided in accordance with a third aspect of the invention. The method includes determining probabilities that certain pixels correspond to dust artifact regions within a digitally-acquired image based at least in part on a pixel analysis of the region in view of predetermined characteristics indicative of the presence of a dust artifact region. A statistical dust record is formed including probabilities of dust artifact regions based on the dust artifact determining and associating operations. A need for service is determined when the statistical dust record indicates that a predetermined threshold dust artifact distribution is present within digital images acquired with the digital acquisition device.

The statistical dust record may be formed from multiple images including at least two images having different values of one or more extracted parameters that are mathematically correlated based on known effects of the different values on dust artifact regions appearing within the digital images. The one or more extracted parameters may include aperture size, F-number, magnification, lens type or focal length of an optical system of the digital camera, or combinations thereof.

The above methods may further include one or more of the following features:

The method may further include eliminating certain suspected dust artifact regions as having a probability below a first threshold value. The method may include judging certain further dust artifact regions as having a probability above the threshold value, such as to be subject to further probability determining including comparison with further acquired images prior to judging whether each further dust artifact region will be subject to the eliminating operation. The method may include determining probabilities that certain pixels correspond to regions free of dust within the images based at least in part on a comparison of suspected dust artifact regions within one or more of said images.

The dust artifact probability determining may include weighting suspected dust artifact regions according to one or more predetermined probability weighting assessment conditions. One or more weighting assessment conditions may include size, shape, brightness or opacity of the suspected dust artifact regions, or degree of similarity in size, shape, brightness, opacity or location with one or more suspected dust artifact regions in one or more other images, or combinations thereof.

The method may include associating probable dust artifact regions with one or more values of one or more extracted parameters relating to the lens assembly of the digital acquisition device when the images were acquired. The statistical dust record may be formed from multiple images including at least two images having different values of one or more extracted parameters that are mathematically correlated based on known effects of the different values on dust artifact regions appearing within the digital images. The one or more extracted parameters may include aperture size, F-number, magnification, lens type or focal length of an optical system of the digital camera, or combinations thereof. The method may further include digitally-acquiring additional images with the digital camera, repeating the determining and associating, and updating the statistical dust record including updating the probabilities of dust artifact regions based on the additional dust artifact determining and associating.

The need for service determination may be automatically performed within the digital camera that comprises the lens assembly, a sensor array, processing electronics and memory. The need for service determination may also be performed at least in part within an external processing device that couples with the digital camera that includes the lens assembly and a sensor array to form a digital image acquisition and processing system that also comprises processing electronics and memory. The programming instructions may be stored on a memory within the external device which performs the image correction method.

The dust artifact determining may include dynamically updating the probabilities based on comparisons with suspected equivalent dust artifact regions within the further digitally-acquired images. The dust artifact determining of the probabilities may be further based on a pixel analysis of the suspected dust artifact regions in view of predetermined characteristics indicative of the presence of a dust artifact region. The digital acquisition device may capture the images from film images. The digital acquisition device may include a digital camera.

BRIEF DESCRIPTION OF THE DRAWINGS

FIGS. 6a, 6b and 6c represent three lenses with the same, fixed, focal distance, with the same focal number, but with different constructions.

FIG. 6d illustrates the concept of an exit pupil and the distance to it.

FIG. 6e illustrates the intersections of the principal ray with windows and image plane, which is preferably approximately the sensor plane.

FIG. 6f illustrates the shift of one dust spec in comparison oa a shift of another dust spec in an image.

FIG. 7a illustrates an influence of a dust particle located on the input surface of the window on the beam converging towards the imaging point.

FIG. 7b illustrates a side view of the rays as obscured by dust as a function of the aperture.

FIG. 7c illustrates a frontal projection of the rays as obscured by a dust as a function of the aperture.

FIG. 7d and FIG. 7e illustrate a power distribution map of the same dust spec as manifested in different f-stops.

FIG. 7f illustrate an effect of the change in focal length on the area obscured by the dust.

FIG. 7g illustrates the direction of movement of dust as a function of the change in focal length in relation to the center of the optical axis.

BRIEF DESCRIPTION OF TABLES

Figure 1:
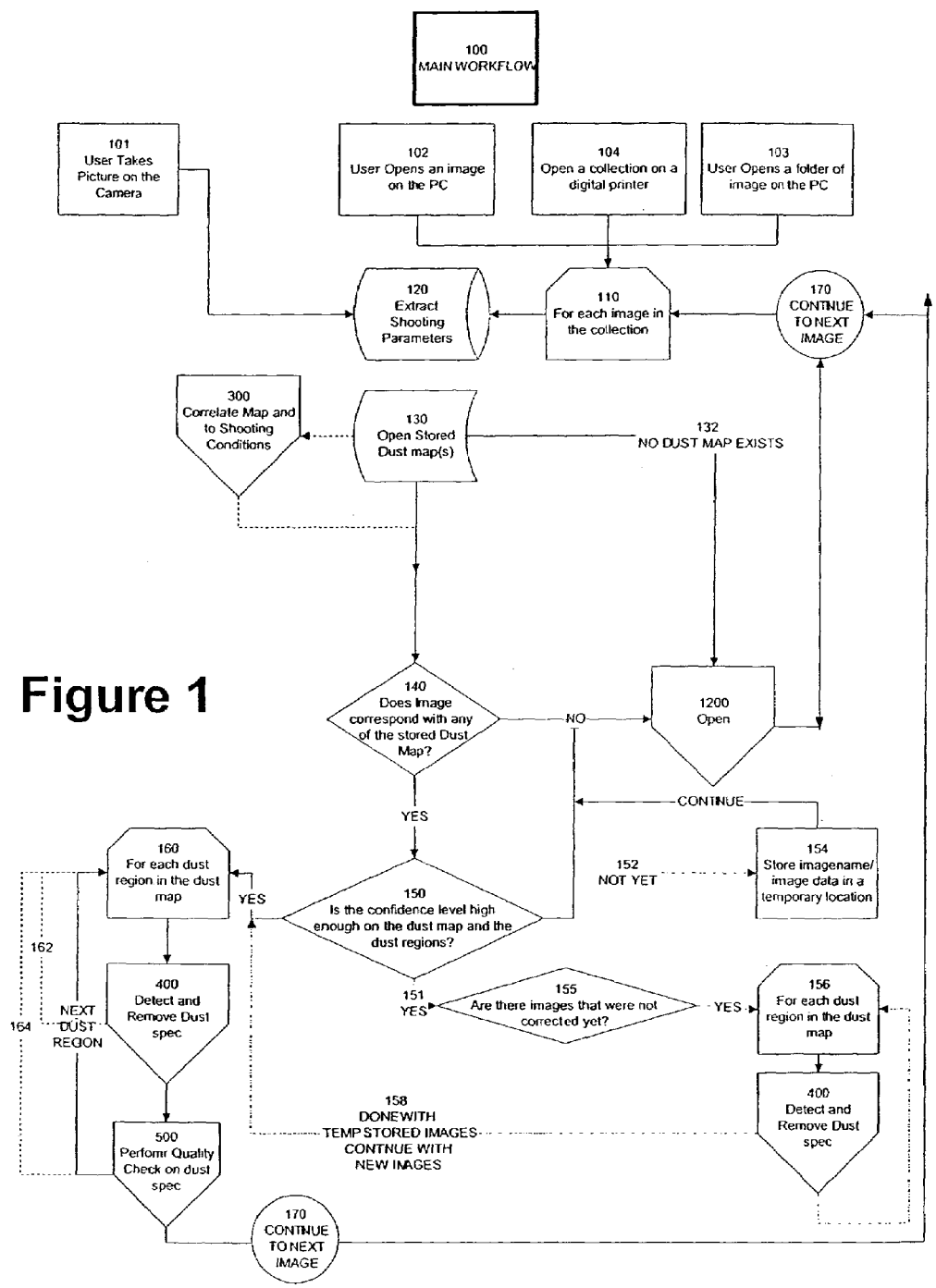
FIG. 1 illustrates a main workflow of a dust removal process in accordance with a preferred embodiment.

Table 1 lists parameters in mathematical formulations of the optical system.

Table 2 lists potential Extracted Lens Parameters.

DETAILED DESCRIPTION OF THE PREFERRED EMBODIMENTS

Some Definitions

Dust specs: The preferred embodiment takes advantage of the fact that many images may have repetitive manifestation of the same defects such as dust, dead-pixels, burnt pixels, scratches etc. Collectively, for this specifications all possible defects of this nature are referred to in this application as dust-specs or dust defects. The effects of those dust specs on digital images are referred to herein as dust artifacts.

Acquisition device: the acquisition device may be a multi-functional electronic appliance wherein one of the major functional capabilities of said appliance is that of a digital camera. Examples can be include digital camera, a hand held computer with an imaging sensor, a scanner, a hand-set phone, or another digital device with built in optics capable of acquiring images. Acquisition devices can also include film scanners with a area-capture CCDs, as contrasted, e.g., with a line scan mechanism. D-SLR: Digital Single Lens Reflex Camera. A digital camera where the viewfinder is receiving the image from the same optical system as the sensor does. Many D-SLR, as for SLR cameras have the capability to interchange its lenses, this exposing the inner regions of the camera to dust.

A few parameters are defined as part of the process:

N Number of images in a collection.

HIdp Number of images for occurrence to be high dust probability

HSdp Number of recurring specs for label a region to be high dust probability p(hsdp) Probability threshold for high confidence of a dust spec.

N dp Number of images to determine that a region is not dust p(ndp) Probability threshold to determine that a region is not a dust region.

Most likely Hidp<=HSdp

I—is a generic image

I(x,y) pixel in location x horizontal, y vertical of Image I pM is a continuous tone, or a statistical representation of a dust map dM is a binary dust map created form some thresholding of pM.

Mathematical Modeling of the Optical System

Prior to understanding the preferred embodiments described herein, it is helpful to understand the mathematical modeling of the camera optical system. With this modeling, the preferred embodiments may advantageously utilize a single dust map for dust detection and/or correction techniques rather than creating a dust map for each instance of dust artifact having its own shape and opacity depending on extracted parameters relating to the imaging acquisition process. With an ability to model the optical system and its variability, a single map may suffice for each lens or for multiple lenses, and for multiple focal lengths, multiple apertures, and/or other extracted parameters as described in more detail below.

In order to study the shadow of an object on a plane, it is helpful to consider the following:

the illumination of the object (the spectral and coherent characteristics of the light)

the shape of the object (including its micro-geometry)

the reflection and transmission properties of the object the relative position of the object and the plane The case of interest for defining the model of dust as it appears on the sensor, is that of an object close to the image plane of a lens, which is a complex optical system, with natural light illumination. The object shape and its reflection and transmission properties are practical impossible to model because no any specific information on the dust particle is available. On the other side, because the dust particles are small, it is very probable to have the same reflection and transmission properties on their surfaces. The distance between the dust and the sensor, which is the image plane is small and is in the order of magnitude of fraction of a millimeter.

Some Definitions as to notations are now provided:

TABLE 2

Parameters in mathematical formulation of the Optical system.

| | |
|---|---|
| Pe- | exit pupil position, the distance between the sensor, and the Exit Pupil |
| tw- | thickness of the window, distance of dust to the image plane |
| f- | focal length of the objective |
| f/#- | focal number |
| (u, v)- | denote the coordinate system of the input surface, having its origin in the intersection point with the lens optical axis. |
| (x, y)- | the dust position on the image plane in the coordinate system in the image plane with the origin in the intersection point with the lens optical axis. |
| I(x, y)- | be the value of the irradiance in the image point (x, y) |
| D- | is the exit pupil diameter |
| $h_0$ | is the distance of the objects on the dust plane to the center of the optical path |
| h | is the distance form the object to the center of the optical axis |
| $h_k$ | is the distance of dust spec k on the dust plane to the center of the optical path |

Figure 6A:
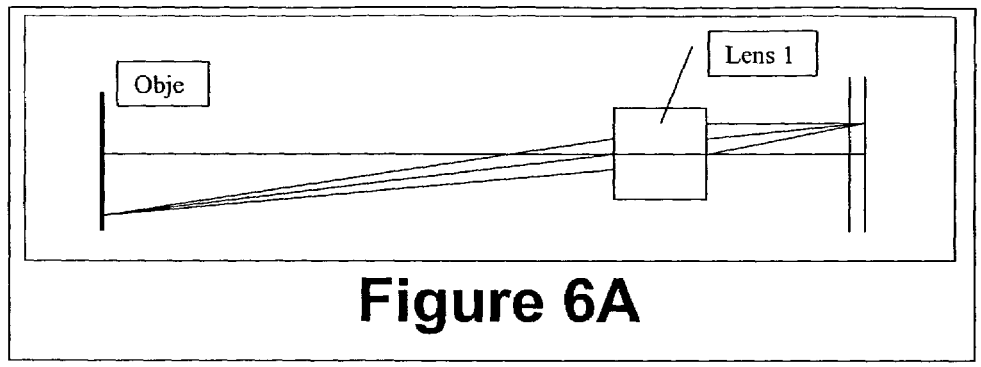
FIGS. 6a-6f represents an optical geometry of a lens that may be used in accordance with a preferred embodiment.
Figure 6B:
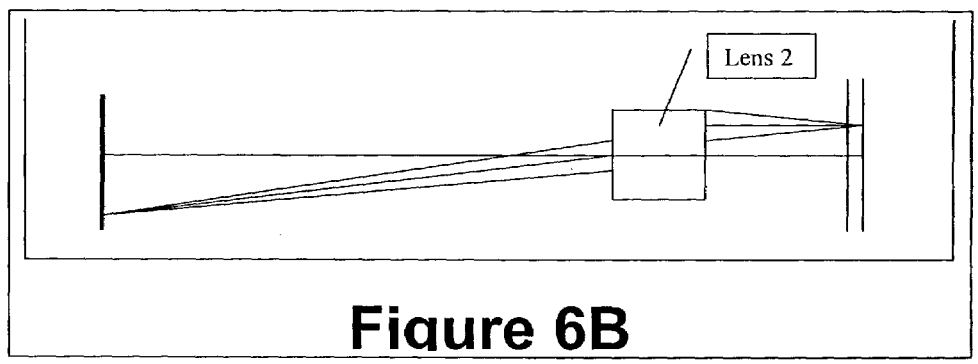
Figure 6C:
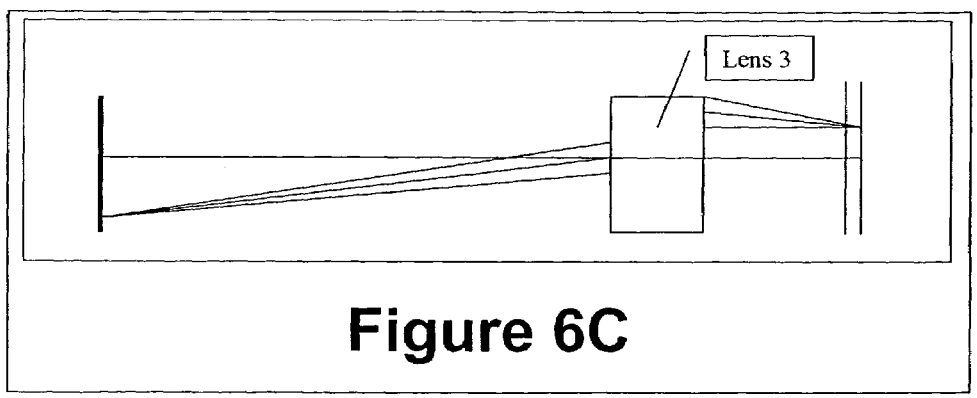
Figure 6D:
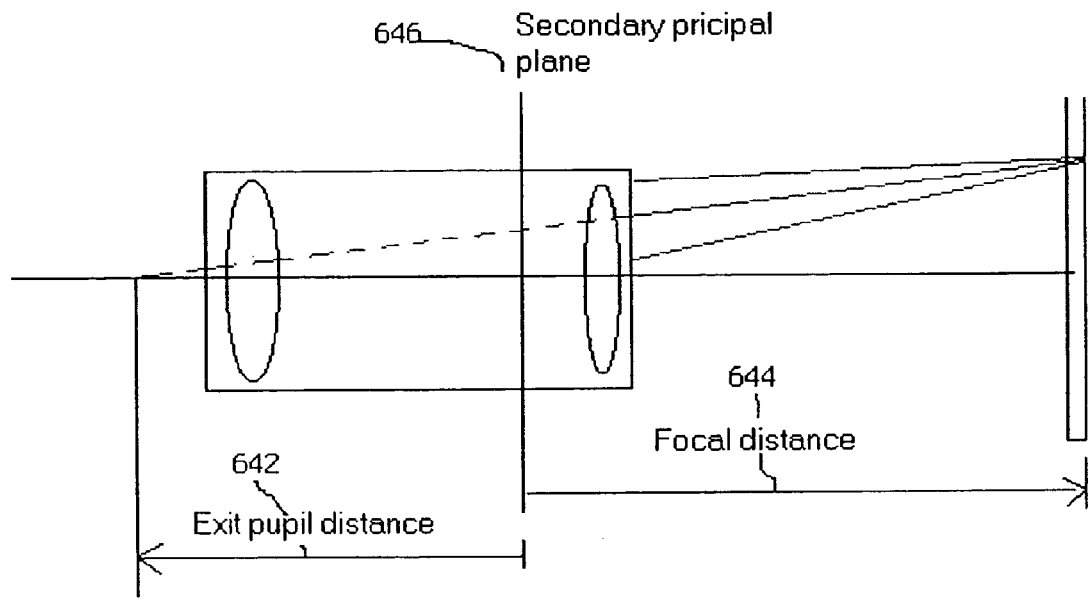

FIGS. 6*a*, 6*b* and 6*c* represent three lenses with the same, fixed, focal distance, with the same focal number, but with different constructions. The first construction, in FIG. 6-*a* is the most common. The second in FIG. 6*b* is specific for the lenses used in metrology. This type of lens is called telecentric in the image space. The third in FIG. 6*c* construction is rarely found in optical systems, but not impossible FIG. 6*d* illustrates the concept of an exit pupil and the distance to it. The exit pupil distance, 644, is the parameter that defines this property, and represents the distance from the secondary principal plane, 646, of the lens and the intersection of the axis of the light cone and optical axis of the lens.

The focal distance 644 represents the distance form the secondary principal plane to the object plane.

In the case of the second type lens, as defined in FIG. 6b, the exit pupil position is at infinity. In the first and third case, FIGS. 6a and 6c respectively, the intersections of the light cone with the dust plane are ellipses. In the case of the second lens type, FIG. 6b the intersection of the light cone with the dust plane is a circle.

In the case of zoom lens, the exit pupil position can be constant (at infinity), or can vary significantly, depending on the construction of the lens.

This information about the exit pupil is usually not public because, in general, it is not useful for the common user of the photographic or TV lenses. However, this information can be readily available with some measurements on an optical bench. Alternatively, this information can be achieved based on analysis of dust in the image.

Figure 6E:
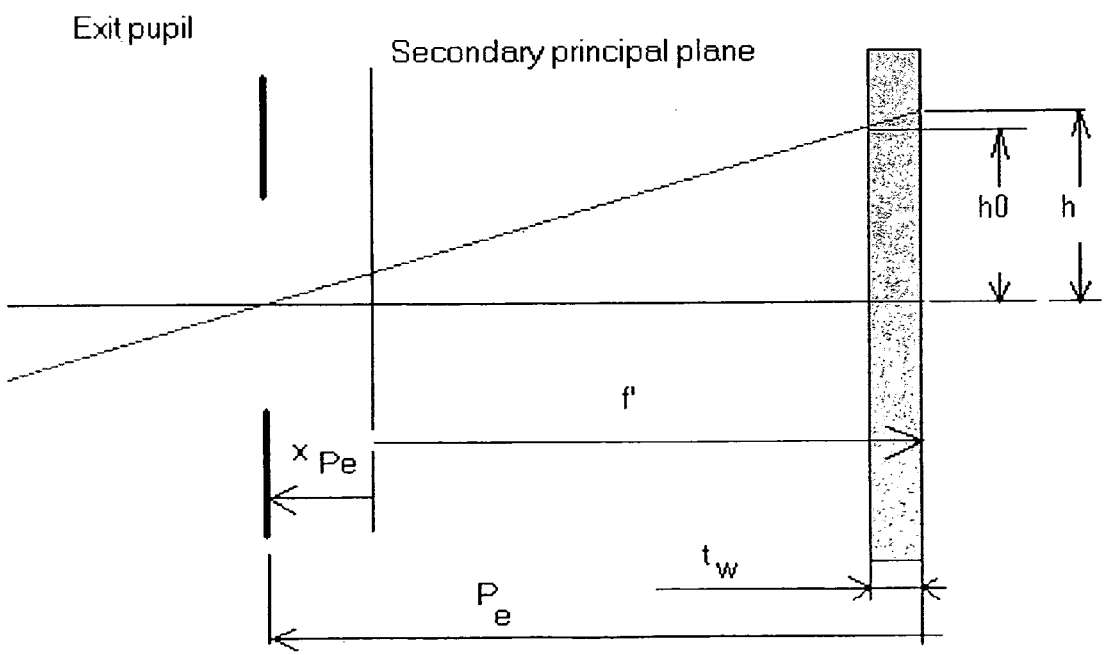
Figure 6F:
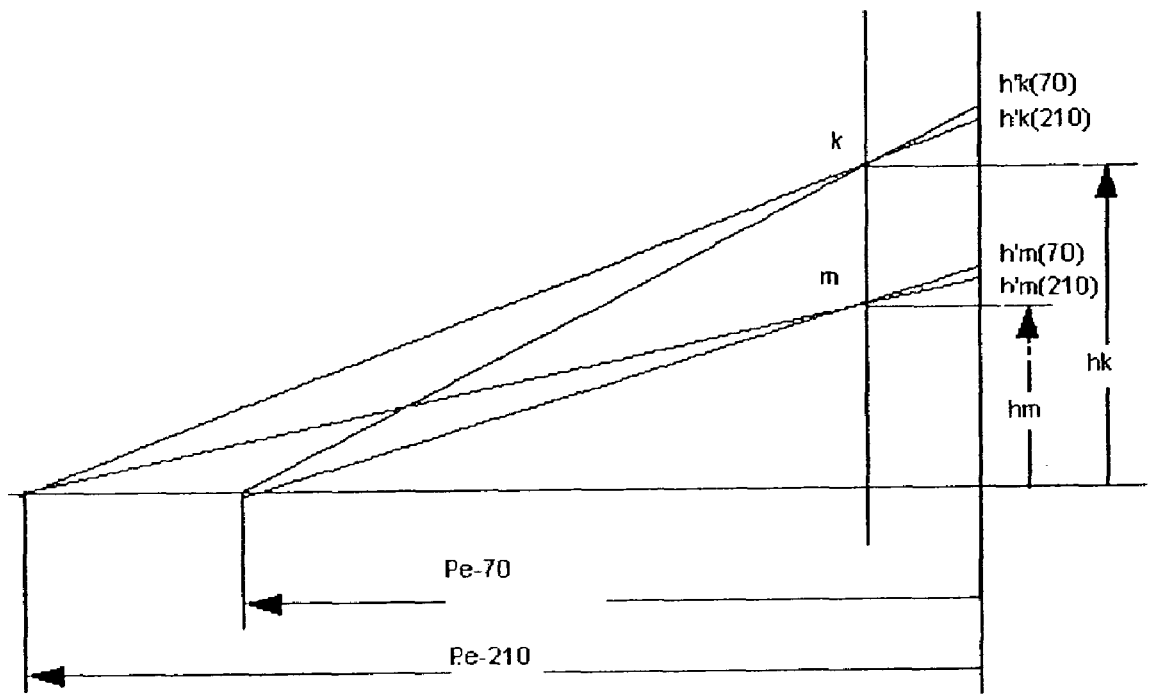
Figure 7A:
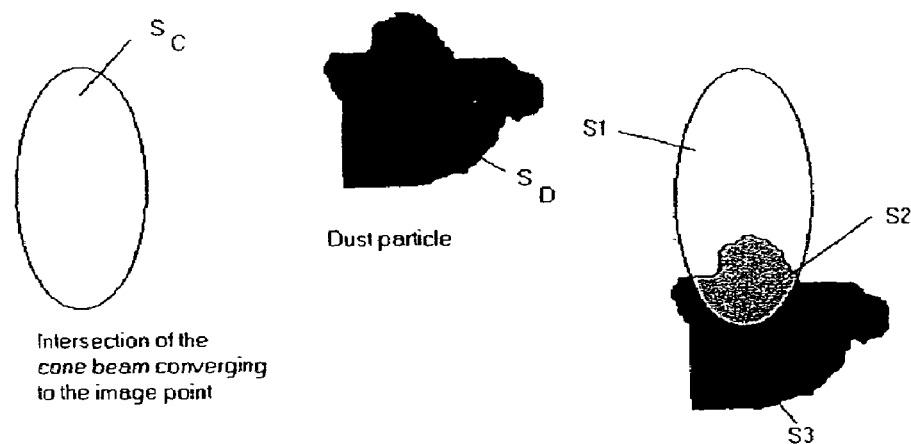
FIGS. 7a-7g generally illustrate effects of dust on the creation of an image using a known optical system.

FIG. 6e illustrates the Intersections of the principal ray with windows and image plane, which is the sensor plane. This figure illustrates the various parameters as defined in Table 1. FIG. 7a describes the influence of a dust particle (obscuration) located on the input surface of the window (obscuration plane), on the beam converging towards the imaging point.

Figure 7B:
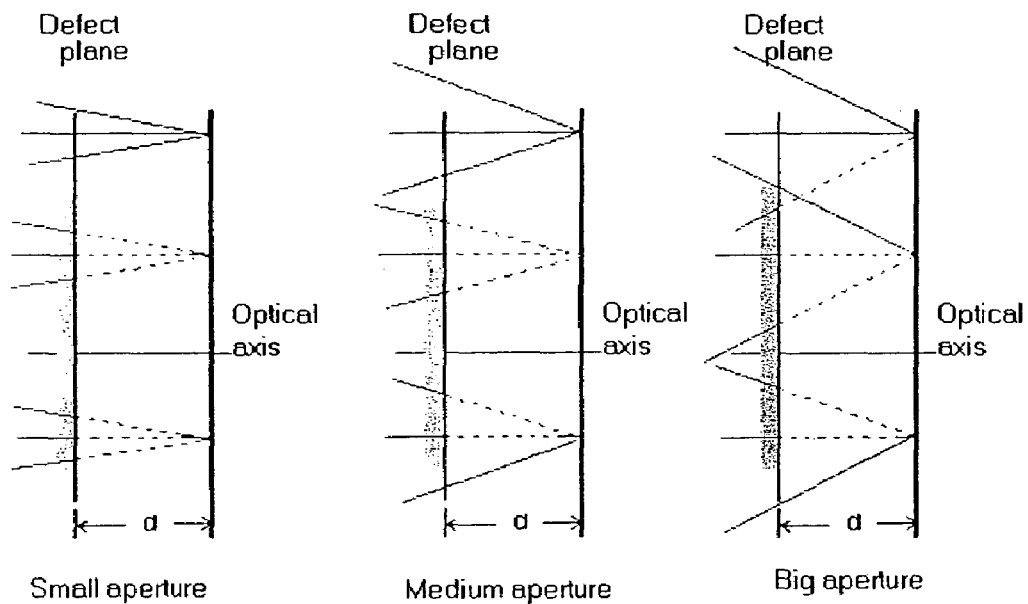
Figure 7C:
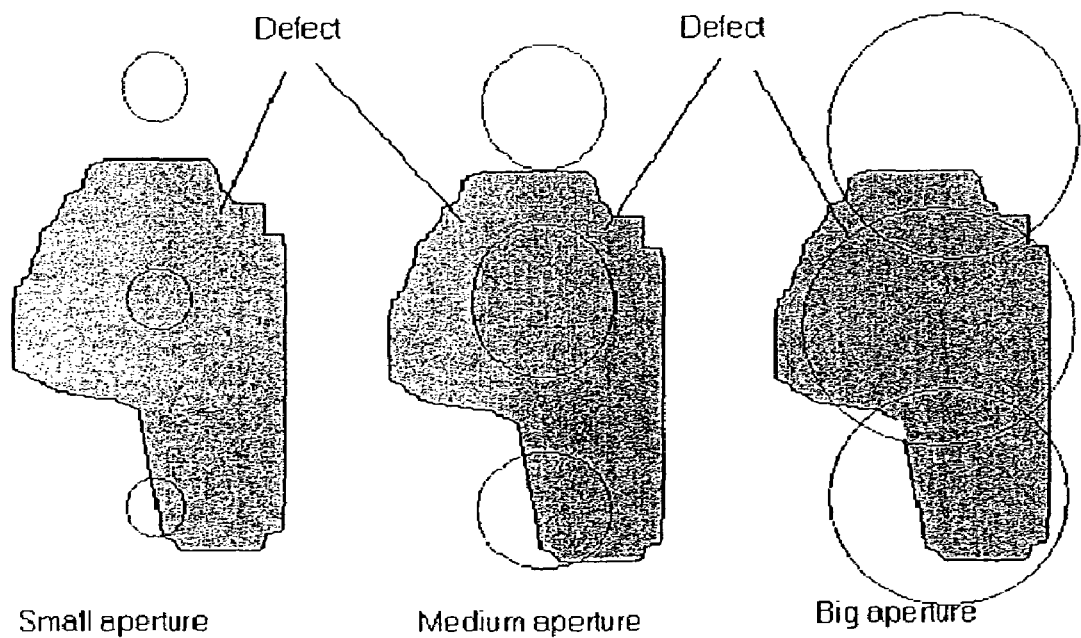
Figure 7D:
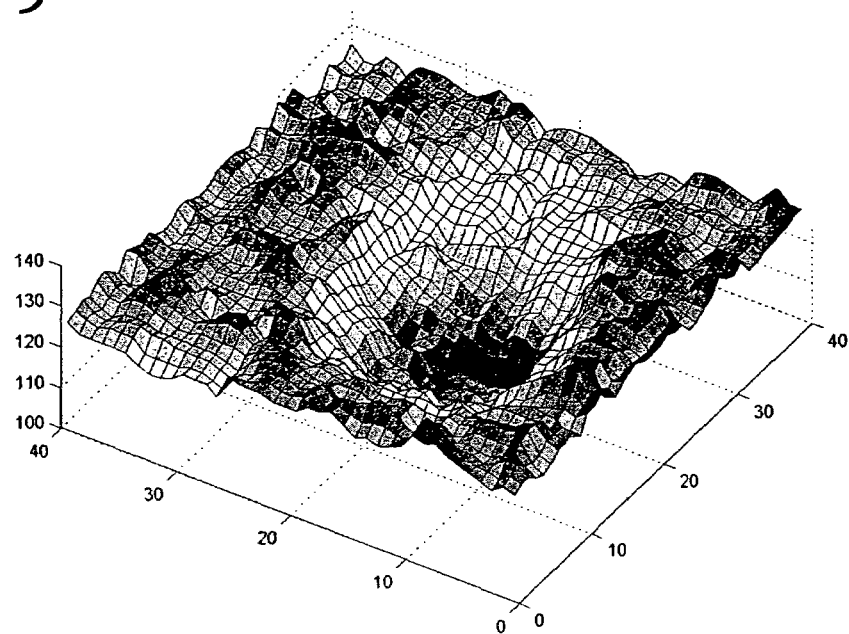
Figure 7E:
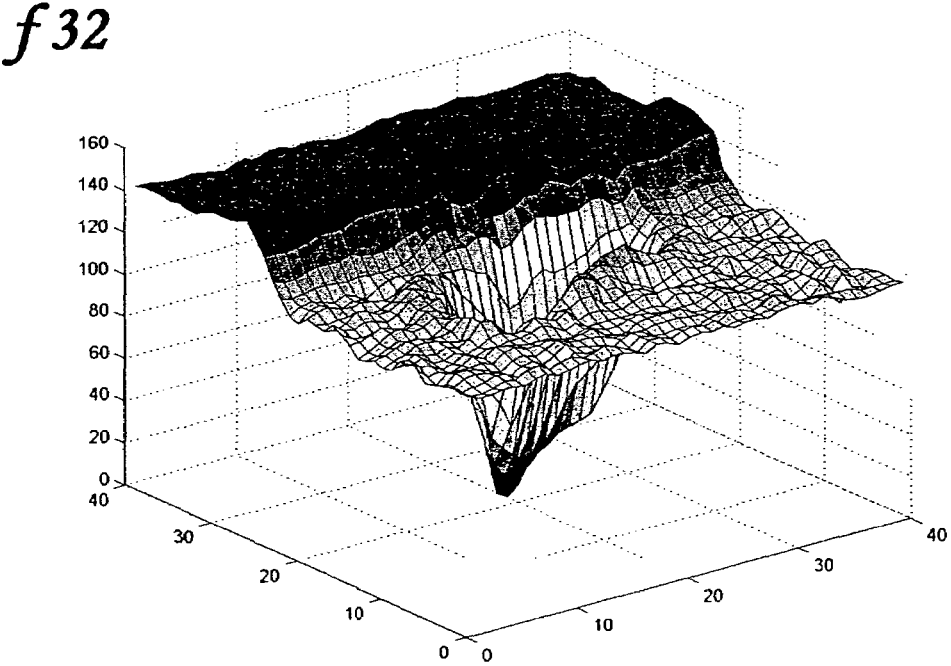

FIG. 7b illustrates the side view of the rays as obscured by a dust as a function of the aperture. FIG. 7c illustrates the frontal projection of FIG. 7-b, of the rays as obscured by a dust as a function of the aperture. FIG. 7d and FIG. 7e illustrates a power distribution map of the same dust spec as manifested in different f-stops, namely a relative open aperture f-9 for FIG. 7d and a closed aperture, namely f-22 and higher, in FIG. 7e. Once can see that the dust spot as recorded with the closed aperture, is much sharper and crisper.

The dust particle is situated in the window plane, and totally absorbing or reflecting the portion of the beam (S2) that normally reaches the image point (P). Let I(x,y) be the value of the irradiance in the image point (x,y) in the absence of the dust particle. Assuming that the energy in the exit pupil of the optical system is uniformly distributed, then, in the presence of the dust particle, the I(x,y) will be reduced proportionally with the ratio between the area of the intersection of the light beam (S1) with the clean zone of the window, and the whole area of the same intersection (Sc).

Remember that Sc is a function of the lens f-number (f/#) and window thickness $t_w$. So, the value of the real irradiance in the presence of dust will be $$I'(x, y) = I(x, y) \frac{S1}{Sc} \quad (4)$$

or, by taking into account that S1=Sc−S2 and S2=Area of intersection between the dust particle and the illuminated area:

$$I'(x, y) = I(x, y)\left(1 - \frac{S2}{Sc}\right) = I(x, y)\left(1 - \frac{S_{D \cap C}}{Sc}\right) \quad (4\text{-a})$$

Because the dust particle is small, the next assumption can be made:

For all the image points affected by a specific dust particle, the area Sc remains constant. In the case of the telecentric illumination, this assumption holds true for all the image points.

With the assumption above, we can correlate the dust geometry, position and shadow.

First of all, we now study the distribution of the irradiance on the input plane of the window. The intersection of the conic beam with this plane is generally an ellipse. The major axis of this ellipse is along the intersection of the plane mentioned above and the plane determined by the image point and the optical axis of the lens.

The minor axis is $$b = t_w \frac{D}{|P_e|} \quad (5)$$

whereas the major axis is $$a = t_w \frac{D}{|P_e|} \frac{1}{\cos\left(\arctg \frac{h}{|P_e|}\right)} \quad (6)$$

where D is the exit pupil diameter, so $$D = \frac{f'}{f/\#} \quad (7)$$

In order to reach a complete formula of the irradiance distribution we now stress the assumption that for all image points affected by a chosen dust particle, "a" varies insignificantly Let $(u_0, v_0)$ be the point of intersection of the principal ray with the plane mentioned above.

So, the characteristic function of the illuminated zone will be $$C = C(u, v, u_0, v_0, f', f/\#, P_e, t_w) \quad (8)$$

Let D(u,v) be the characteristic function of the dust Then, the center of the cone intersection with the input plane of the window will be given by (3).

Thus, $$S_{D \cap C} = \int_R \int_{xR} D(u, v) * C(u, v, u_0, v_0, f', f/\#, P_3, t_w) du dv \quad (9)$$

$$I'(x, y) = I(x, y) \left(1 - \frac{\int_R \int_{xR} D(u, v) * C(u, v, u_0, v_0, f', f/\#, P_e, t_w) du dv}{Sc}\right) \quad (10)$$

which eventually, using the relation (3), yields $$I'(x, y) = I(x, y) \left(1 - \frac{\int_R \int_{xR} D(u, v) * C\left(u, v, \left(1 + \frac{t_w}{P_e}\right)x, \left(1 + \frac{t_w}{P_e}\right)y, f', f/\#, P_e, t_w\right) du dv}{Sc}\right) \quad (11)$$

The terms $(1+t_w/P_e)x$ and $(1+t_w/P_e)y$ determine the "movement" of the dust shadow with the change of the focal distance and, implicitly, of the Pe, as explained later on in equation 13.

In the case of the telecentric illumination

Pe is infinite, u0=x and v0=y.

the ellipse becomes a circle

Qualitatively, as described quantitatively in equation 11, the fall off, or the diminished effect of the dust on an image varies as follow: The dust is becoming less significant as the aperture becomes larger, or the f-stop is smaller and the pixels are inversely affected based on the distance of the pixel to the periphery of the dust.

Figure 7F:
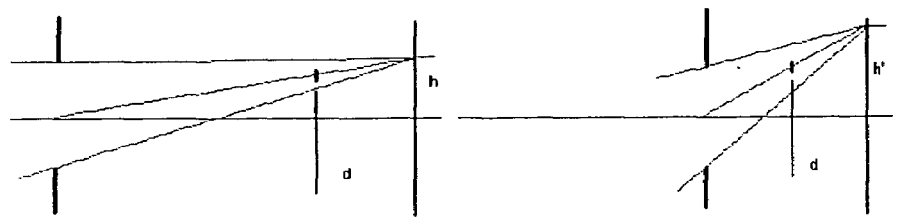
Figure 7G:
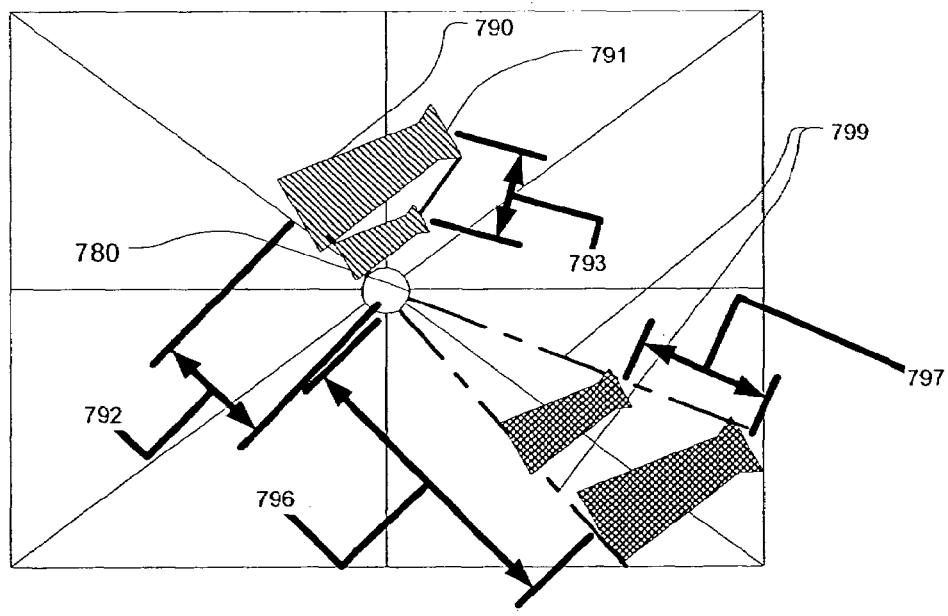

FIG. 7f illustrates the adaptation between the dust map and the image based on the focal length of the lens. In this figure one can qualitatively see that the area covered by the dust spec will be shifted as a function of the focal length.

Also, information about the spatial distribution and/or orientation of dust particles within the dust map may be used to assist with determining probabilities that regions are either dust or non-dust. As an example, one could expect that a global average of the orientation of elongated dust particles would average to zero. However, at a more localized level, charged and/or magnetized dust particles can tend to align with similar orientations due to local dielectric forces. This effect would be partly dependent on the size, overall shape distribution (round or more elongated) and the overall distribution (uniform or clumped) of the dust regions in the dust map. This can tend to be particularly helpful when a decision is to be made as to whether to eliminate certain regions. E.g., most of the dust may be aligned in a radial direction relative to the center of the sensor, and then particles in a concentric alignment are less likely to be dust. Given the definitions above, a more quantitative model can be deducted.

$$h = h_0 \frac{1}{1+\frac{t_w}{P_e}} \cong h_0\left(1-\frac{t_w}{P_e}\right) \quad (12)$$

because the ratio $t_w/P_e$ is small. Note that Pe has in common cases a negative value.

Let (u,v) denote the coordinate system of the input surface, having its origin in the intersection point with the lens optical axis. Similarly, let (x,y) be the coordinate system in the image plane with the origin in the intersection point with the lens optical axis.

Thus, if the principal ray of the beam intersects the input window plane in the point (u,v), the point in the image plane on the same principal ray will be The inverse transformation of (2)

$$\begin{bmatrix} x \\ y \end{bmatrix} = \begin{bmatrix} 1-\frac{t_w}{P_e} & 0 \\ 0 & 1-\frac{t_w}{P_e} \end{bmatrix} \begin{bmatrix} u \\ v \end{bmatrix} \quad (2)$$

with the same assumption of a small tw/Pe ratio will be $$\begin{bmatrix} u \\ v \end{bmatrix} = \begin{bmatrix} 1+\frac{t_w}{P_e} & 0 \\ 0 & 1+\frac{t_w}{P_e} \end{bmatrix} \begin{bmatrix} x \\ y \end{bmatrix} \quad (13)$$

FIG. 7j depicts how points will shift as a function of the proximity to the optical center. Basically the farther the dust is form the center, the larger the displacement is. However, the direction and size of the displacements can be estimated. At the same time, the closer the dust spot is to the center, the more its shape will change.

There are a few parameters that are not published. The distance, Tw, of the dust to the image plane is typically fixed for the camera and a single measurement can achieve that. The exit pupil distance may vary depending on the focal length of the lens, in particular for a zoom lens, the Exit pupil distance may not be most likely fixed, and can vary up to a telecentric mode where the distance is infinity.

However, such information can be empirically extracted by analysis of images taken by a known camera and lens, as illustrated below and in FIG. 7e. In this case, knowledge of the effect of one dust spec can be used to calculated the shift for any other dust spec in the image.

In this figure a hypothetic zoom lens of 70 mm-210 mm is illustrated:

Pe-70 is the exit pupil position for the lens at 70 mm,

Pe-210 is the exit pupil location when the lens is at its highest enlargement 210 mm.

k, is known dust m is hypothetical dust $h_k$ is h for a specific dust particle k.

The knowledge of the shift of dust image (preferable near to one of the corners of the image). The equation (12)

$$h \cong h_0\left(1-\frac{t_w}{P_e}\right) \quad (12)$$

can be written for a specific dust particle (k) and underline the dependence with the focal distance, $$h_k(f) = h_{0k}\left(1-\frac{t_w}{P_e(f)}\right) \quad (12\text{-a})$$

or $$\frac{h_k(f)}{h_{0k}} = \left(1-\frac{t_w}{Pe(f)}\right) \text{ independent from } k \quad (12\text{-b})$$

So, if we know the evolution of the image of the "k" dust particle we can find the evolution of the "m" dust image $$h_m(f) = \frac{h_{0m}}{h_{0k}} h_k(f) \quad (12\text{-c})$$

The problem with this formula is again we don't know the positions of the dust particles Writing the upper formula for a given focal distance, say $f_0$, we have $$\frac{h_{0m}}{h_{0k}} = \frac{h_m(f_0)}{h_k(f_0)} \qquad (12\text{-d})$$

So, finally $$h_m(f) = \frac{h_m(f_0)}{h_k(f_0)} h_k(f) \qquad (12\text{-e})$$

This relation do not need the exit pupil dependence, the thickness of the window and the dust position. FIG. 7-g, illustrate the phenomena visually. Based on the above formulae, and in particular 12-e and 13, one can see that the dust movement is not constant, as a function of the focal length change, but is dependent on the distance of the dust to the center of the optical path. Qualitatively, the farther the dust is form the center, the larger the displacement will be. In other words, dust closer to the periphery of the image will have larger movement than the dust in the center.

Referring to FIG. 7-g which describes the movement of two hypothetical dust spots, 790 and 794 having a different distance, 792 and 796 respectively, to the center of the optical path 780. The movement of each pixel in always on the line between the pixel and the center of the optical path. This is based on the linear relationship depicted in equation 13. Thus the movement of the dust edge of dust spec 794 is along the lines depicted in block 799. Based on assumed coefficients for equation 13, dust spec moves be a fixed ratio $1+t_w/P_e$, which can be positive or negative, which means move inwards towards the center or out of the center. In this figure, dust spec 794 will move to become 795 while dust spec 791 will move to become 791, because the movement is linear, because the distance of dust 794 to the center depicted by 796 is larger than the corresponding distance depicted by block 792, the movement of the dust 794 will be larger.

Alternatively, given formula (13) and given an image where the dust can be detected, one can calculate Pe as follows:

$$\frac{x}{u} = \frac{y}{v} = 1 + \frac{t_w}{P_e} \qquad (13\text{-a})$$

or $$P_e = (1+t_w) \times \frac{u}{x} = (1+t_w) \times \frac{v}{y} \qquad (13\text{-b})$$

In summary of the mathematical model of the optical system for dust, in the general case, the way the image is affected by the dust depends on:

| | |
|---|---|
| exit pupil position | Pe |
| thickness of the window | tw |
| focal length of the objective | f |
| focal number | f/# |
| the dust position on the image plane | (x, y) |

This can be calculated by knowing the optical system's components:
a) the window thickness (tw),
b) the function Pe(f)
c) and
d) the coordinates (u,v) of the dust if we want to determine the dust image position on the image plane The main workflow of detecting and removing the dust from an image is illustrated in FIG. 1. The preferred embodiment is activated in four different cases. In general, this preferred embodiment works for removing dust form a collection of images having the same acquisition device. Specifically, a user may acquire a picture on her digital camera (as illustrated in Block 101). Alternatively (102), a user may open a single image on a external device such as a personal computer, open (103) a folder of images on an external device or open a collection of images on a digital printing device (104).

The preferred embodiment then extracts the shooting parameters (120). Such parameters include, but not limited to data about: Camera name, Lens brand, lens type, focal length at acquisition, aperture range, aperture at acquisition.

In addition, some parameter, in particular on the lens and the camera may be also stored in the device, which is the acquisition device such as the digital camera or the processing device such as the personal computer or digital printer. Such information, which may include parameters such as exit pupil, exit pupil distance regarding the lens, or distance of dust to sensor for the camera.

A table with such data may look like:

TABLE 2

Extracted Lens Parameters

| Field | Example of data | Category |
|---|---|---|
| Lens Manufacturer | Nikon | lens |
| Lens Type | AF 24 mm–45 mm f2.8–f3.5 | lens |
| Focal Length | 38 mm | Acquisition data |
| Aperture | f-16 | Acquisition data |
| Dust distance | 0.156 mm | Camera data |
| Exit pupil | 19 mm | Lens data |
| Exit pupil distance | 230 mm | Lens data |

The dust map may also include meta-data that are different the list of extracted parameters. Moreover, that which is described as being extracted parameter dependent or encoded with extracted parameter value data or based on a value of an extracted parameter can be broadened to include other meta-data than just the extracted parameters listed in Table 2. For example, certain meta-data are dependent on parameters existing at the time of acquisition of the image, and can be camera-specific or not. The amount of ambient light available will depend on whether there is artificial lighting nearby or whether it is a cloudy day. Discussion of meta-data as it relates to image acquisition is found in more detail at U.S. patent application Ser. No. 10/608,810, filed Jun. 26, 2003, and is hereby incorporated by reference.

In the case that the system deals with multiple images (as defined in 102, 103, and 104), the algorithm describes a loop operation on all images (110). The first step is to open a dust map (130). If non exists (132) the system will create a new dust map (200) as further described in FIG. 2. In the case that the system has a few dust maps (130) the software will try to correlate one of the maps (300) to the image. This process is further illustrated in FIG. 3. In particular this correlation refers to the adjustment of the shooting conditions to some accepted standard. The acquisition conditions in particular refer to the aperture and the focal length. The correlation process is interchangeable and can be done by adjusting the image to the map or adjusting the map to the image. In some cases both acquired image and dust map should be adjusted to some common ground. Such an example may happen when the ma is calculated based on a aperture that the lens does not reach or a different lens than the one used wit different optical configuration. Alternatively, such as in the case of a new lens, this process (300) as called by 130, may be used to adjust the map onto a new map and from that stage onwards continue with a single map.

If no dust map corresponds with the image (140), a new dust map is created (200). When a dust map does correspond (140) to the image, the preferred embodiment checks if the dust specs as defined in the dust map are of high enough confidence level to being dust regions (150). The statistical decision as to the way such confidence level is calculated for the dust map in general and for the individual dust specs, is further discussed in FIG. 2 and FIG. 3. If the confidence level is low, the image is added to the updating of the dust map (200). If after the image is added, the confidence level is high enough (152) the software continues to the dust removal process (160). Otherwise, the software progresses to the next image (170).

For example, a dust map is considered valid after 10 images are analyzed, and a dust spec is considered valid after a dust is detected in 8 images. In this case, after analyzing 9 images, the software may continue to the stage of updating the dust map (200) but upon completion (10 images) there is a valid dust map, and the software will continue to the correction (160) stage. If however the loop (110) is only on its $1^{st}$ to $8^{th}$ image, no correction will be done.

As an additional embodiment, images can be corrected retroactively after the dust map reached high enough confidence. This can be used for batch processing or off line processing or processing where the information is gathered in parallel to the needed correction. In this embodiment, when the confidence level is not enough (152, NOT-YET) the images, a pointer to them, or a list of them, or a representation of them, that were used to create the dust map are stored in temporary location (154) and when the dust map is ready (151—YES), the software will retroactively remove the dust from all those images (156). In this fashion, all images, including ones that originally did not hold sufficient statistical information, may be corrected.

Referring to the dust detection and correction process (160). This process may be executed as a loop on every dust spec in the dust map, with a stage of detection and correction (400, followed by 166 and 168). Alternatively, the process can be implemented where all dust specs are detected first (162) and then all dust specs are corrected (164). The decision as to the sequence of operations varies based on implementation criteria such as what regions of the image are in memory, and should not affect the nature of the preferred embodiment. As part of the detection, the software also performs a self testing (500) where each new image introduced is compared to the dust map. This process is further defined in FIG. 5. The importance of this stage for each dust spec and for the dust may, is that in this manner, if the dust situation changes, such as a single spec moving aground or the camera being serviced), the software will immediately detect the change and re-validate the dust map. As described above, the validity test (500) can be implemented on a dust spec by dust spec or on the full dust map.

Figure 2A:
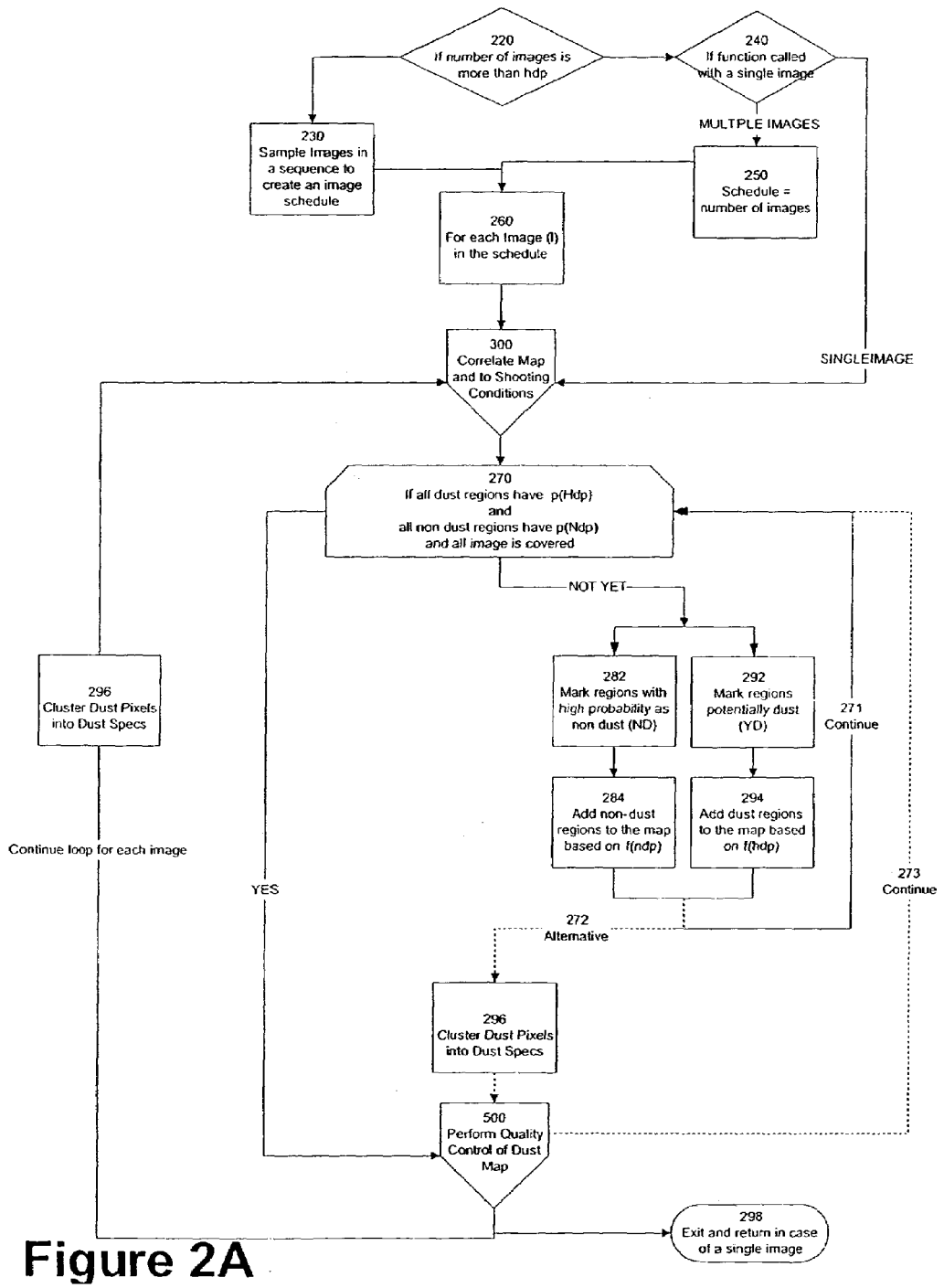
FIG. 2a illustrates the creation of a dust map.
Figure 2B:
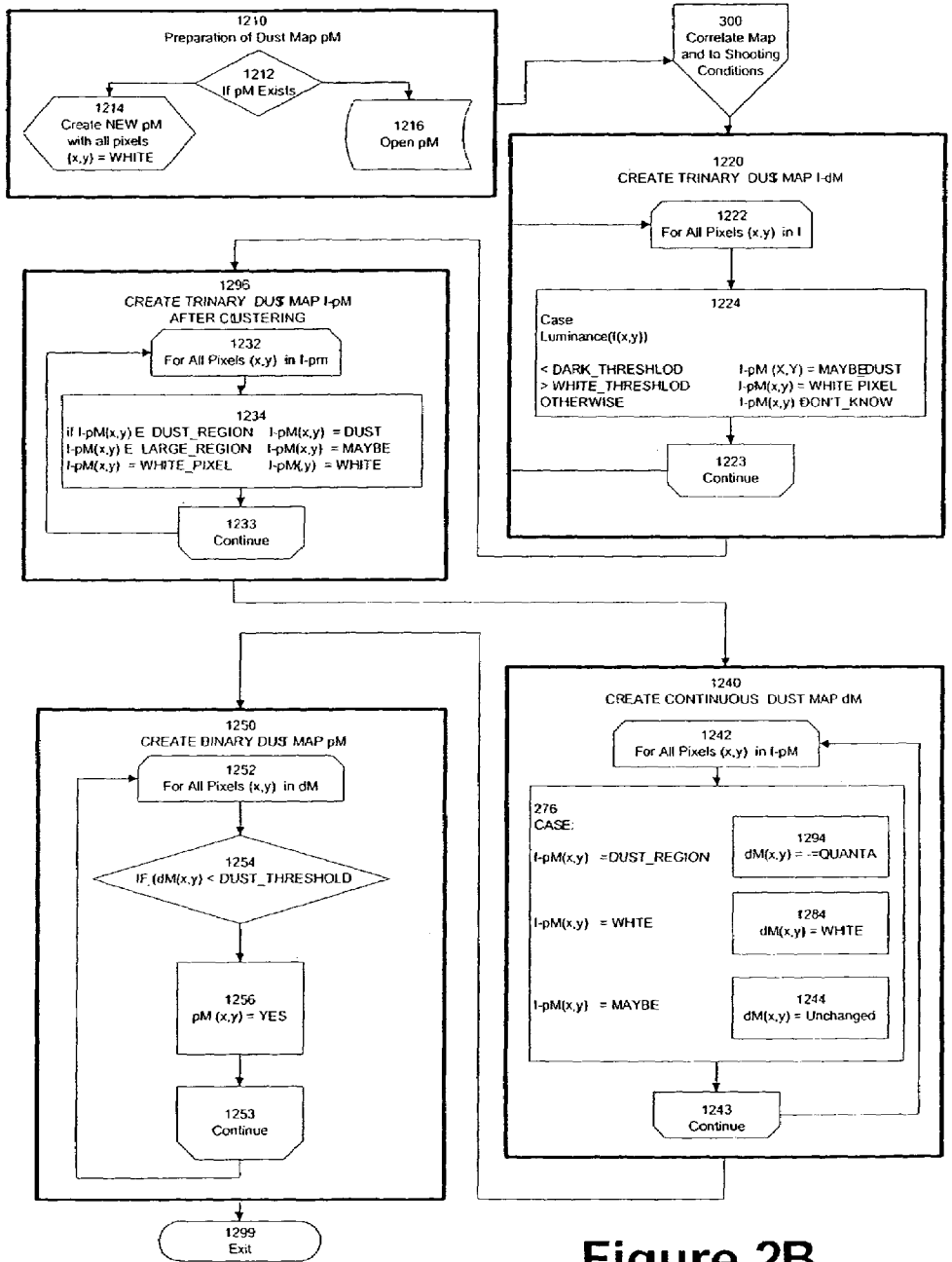
FIG. 2b illustrates an alternative embodiment of the creation of a binary dust map.

Referring to FIG. 2-*a* where the Dust map creation and updating is defined: This process can receive a collection of images as defined by FIG. 1. blocks 108 and 109) or one image at a time is refereed to this process, as defined by FIG. 1. block 110. If the function is called with a single image (220—SINGLE IMAGE) the image is directly provided to the calculations (270). If multiple images are provided (240 MULTIPLE IMAGES), then an initial step is to define if there are more than enough images for defining the map. This step is designed to optimize the creation process for dust in case of large amount of images.

The sequence of the images that are to be referenced based on the original collection of N images as defined in FIG. 1 blocks 102, 103 or 104. The sequence of images is based on a few criteria such as: giving more weight to images shot last, and if images are shot in a relatively small time frame, allocate the sequence is large distances to try and assure minimal repetitiveness between similar images that may have been taken of the same object with little movement. The sequence will not be limited to the number of images (HIDP) because it may well be that some regions will not have enough data in them to evaluate the dust. This may happen in cases where part of the image is very dark in some of the images.

As an example: if N (number of images in a selection)=30; and HSdp (number of images needed to determining map) =10; and all images were shot in a space of an hour; then a potential sequence may be:

30, 27, 24, 21, 18, 15, 12, 9, 6, 3, 29, 26, 25 . . . , 2, 28, 25 . . . 1

Alternatively if the same 30 images were taken over a period of a month it may be beneficial to select images sequentially (last one shot is the first to be calculated):

30, 29, 28 . . . 20, 19 . . . 2, 1

And in some cases this process of sampling the series (270) may also decide not to use images that are taken too long from the last image. In this case, for example if image 1-15 were taken in July and 16-30 were taken in November, this process may limit the new map to 16-30 or even create two different maps, one for images 1-15 and the other for 16-30.

In a different criteria, the parameters as extracted from the images will determine the sequence and the number of dust maps that are to be calculated. For example if a folder contains N=30 images, where 15 were taken with one camera and 15 with another, the sampling step (270) may create two map sets.

Another criteria for creating a new set or checking for new dust is the type of lens. If a lens is changed, it means that the CCD-cavity was exposed to potential new dust. This may trigger a new set of images to be looked at. It may also be an indication that the camera was serviced, or that the photographer cleaned the camera. Of course, if there is a parameter that defines when a camera was serviced, this will trigger the creation of a new dust map.

Those familiar in the art may be able to determine the right combinations of creating this sequence based on the nature of the dust, the camera and the lens. The next loop (270-271) defines the marking of each region and the addition of the region to the dust map if it is not already there. There are three type of regions in an image, the first are images with sufficient information to detect whether they are of dust nature. As an example, dark regions surrounded by a light background. Other criteria may be regions with a relatively small color saturation. The second group are regions that are definitely non-dust. Such regions are for example all clear, or of high color saturation. Other regions are inconclusive such as a very dark segment of the image. In this case, it will be hard to detect the dust even if it was part of the image. Alternatively when looking for over exposed or "dead pixels" the criteria may be reversed, if the pixels appear as a white spec in the image.

The criteria may be also a function of the acquisition parameter. For example an image with a open aperture may all be marked as in-decisive, because the dust may not appear on the image. Regions that are potentially dust are marked (292) and then added to the dust mask (294). The addition may be the creation of a new dust spec on the map or the modification of the probability function or the confidence level counter for the region. Regions that are most likely non-dust are marked (282) and then added to the dust mask (284). The addition may be the creation of a new dust spec on the map or the modification of the probability function or the confidence level counter for the region. The additions of the regions needs to be normalized to the shooting conditions as defined by the dust map (300) if this step was not performed prior to entering this function, as optionally defined in FIG. 1.

This loop continues over all regions of the image (271). Alternatively (272), each region is compared (500) with the map dust to se if there is no case where the monotonicity is broken, i.e. a region that was of high probability to be dust is now non dust. FIG. 2-*b* describes an alternate embodiment of the dust creation process. Block 1210 describes the preparation of the dust map which includes either opening an existing map 1216 or creating a new one 1214, where all pixels as a starting point are non dusst or WHITE. After the map is correlated to the shooting conditions, 300, a dust map I-dM is created in block 1220.

All pixels in the image, 1222, receive the following values 1224 based on the luminance value of the pixel: Case If luminance is less than DARK_THRESHOLD, then I-pM (X,Y)=MAYBE_DUST;

If luminance is greater than WHITE_THRESHLOD, then I-pM(x,y)=WHITE PIXEL;

OTHERWISE I-pM(x,y)=DON'T_KNOW.

Once all pixels are analyzed, 1220, they are then clustered, 1296 into dust regions or dust specs in a I-pM dust map. The next step is to create a dust map dM which is continuous based on the value of the individual pixels. In the final stage 1250, the dust map is threshold by the predetermined value THRESHOLD to create a binary mast.

Figure 3:
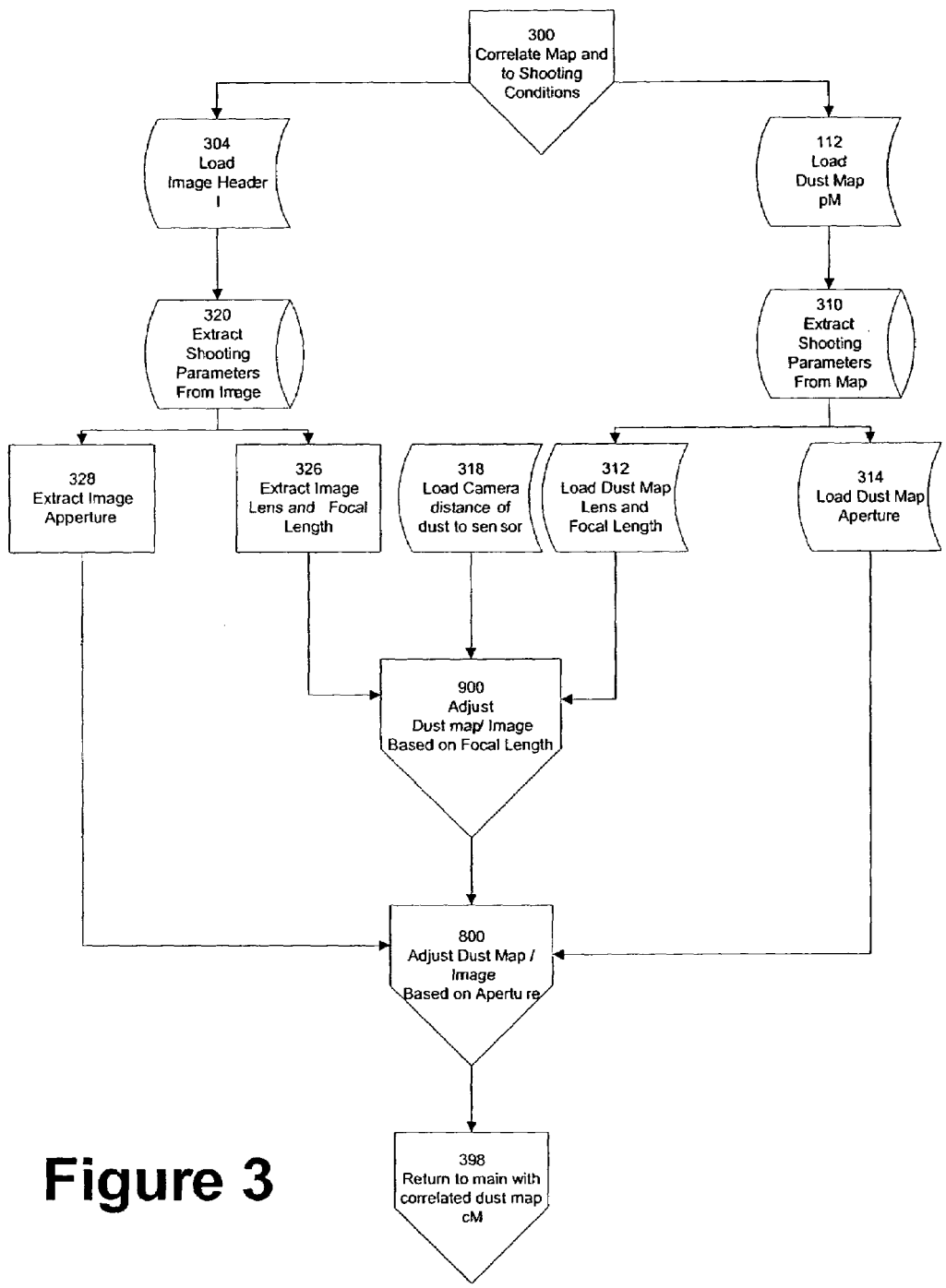
FIG. 3 outlines a correlation of a dust map to image shooting parameters.

FIG. 3 illustrates the process of correlating the image to a default settings of the dust map. This process defines correlating the image o the dust map, the dust map to a new dust map of the dust map to the mage. In particular this correlation refers to the adjustment of the shooting conditions to some accepted standard. The acquisition conditions in particular refer to the aperture and the focal length. The correlation process is interchangeable and can be done by adjusting the image to the map or adjusting the map to the image. In some cases both acquired image and dust map may be adjusted to some common ground. Such an example may happen when the ma is calculated based on a aperture that the lens does not reach or a different lens than the one used wit different optical configuration. Alternatively, in case of a new lens, this process (300) may be used to adjust the map onto a new map and from that stage onwards continue with a single map.

To begin with, the dust map is being loaded (112) and the default data on which the map was generated is extracted (310). Such data may include the lens type, the aperture and the focal length associated wit the default state. In concurrence, the information form the acquired image (304) is extracted (320) and compared to the one of the dust map.

A explained in the mathematical model of the optical system, the two main adjustments between the dust map and the image are based on focal length, and on aperture, each creating a different artifact that should be addressed. Knowledge of the phenomena may assist in creating a better detection and correction of the dust artifact. Alternatively, in a separate embodiment, analysis of the image and the modification of the dust as changed by aperture and focal length, may provide the necessary mathematical model that describes transformation that defines the changes to the dust as a function of change in the lens type, the focal length and the aperture.

The mathematical distortion of the dust as a function of the aperture is illustrated in FIG. 7*a*-7*f*. The geometrical optics illustrations of the above phenomena are depicted in FIGS. 6*a*-6*e*. Referring to FIG. 3, after extracting the data, the following step is modification of the map and or the image based no focal length (900), and based on aperture (800). The following steps are further defined in FIG. 9 and FIG. 8 respectively.

Following the too step (800 and 900) the Image and the Dust Map are considered to be correlated. The correlated map cM is no longer binary because it defines both the shift and the fall off which is continuous. FIG. 400 defines the process of detecting and removing the dust from the image. The input is the image I is loaded, if it is not already in memory (404) and the correlated dust map is cM is loaded (402) if already not in memory.

The process of detecting and removing the dust is done per dust spec. This process is highly parallelized and can be performed as a single path over the image, or in strips. The flexibility of performing the operation on the entire image, or in portions, combined with the correlation or as a separate process, enables a flexible implementation of the algorithm based on external restrictions defined by the hardware, the run time environment, memory restrictions and processing speed.

As defined and justified by the physical phenomena, the method of correcting dust artifacts is defined based on two different operations. The former is the retouching or the in-painting here regions with no data (420), or data that is close to noise to be recreated as defined in 430 and later on in FIG. 7*e*, 7*f*. The second portion of the correction is based on the tapering degradation of surrounding pixels as a function of the aperture, as illustrated in FIG. 7*b*, 7*c*, 7*d*. Referring to the image enhancement portions, where the data exists but most likely not in its full form, due to the fact that some of the dust affects the quality of the image, but some regions still contain some data (420), an image enhancement algorithm is performed on the pixels (430). In a simplified embodiment (432), assuming that the optical model is simplified to a degradation in the overall brightness as defined by the OPACITY, the enhanced pixels will receive a value inversely related to the OPACITY i.e. 9432)

$$I'(x, y) = \frac{I(x, y)}{\text{OPACITY}}$$

Figure 5:
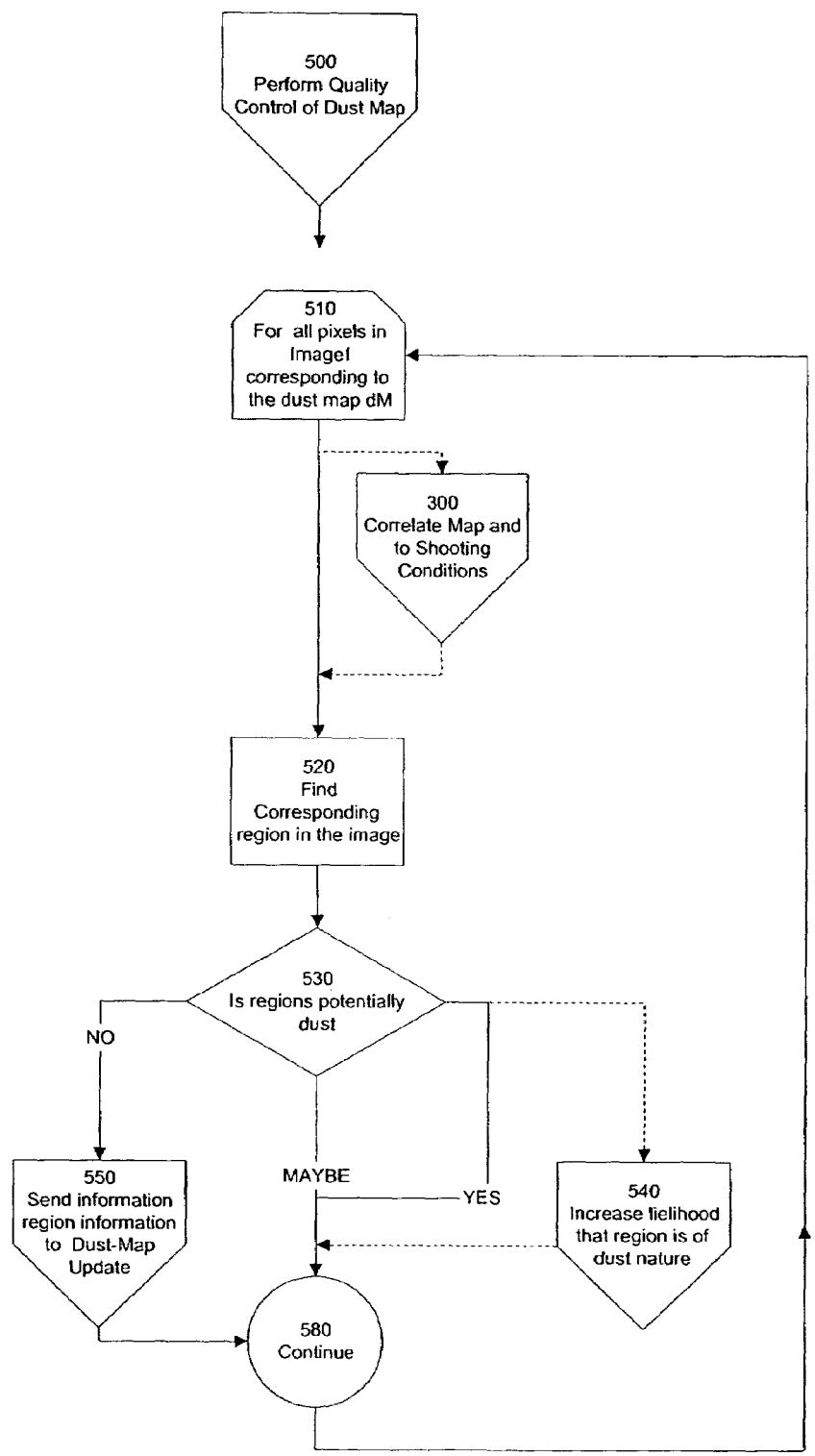
FIG. 5 illustrates a quality control method of checking the dust map.

To maintain a check of the validity of the model, the pixels before being operated on may be send for validation (500) as described in FIG. 5. The second portion of the image correction is the restoration or the inpainting (460). In this case, the area behind the dust has no relevant data to enhance, or if there is, this data is relatively close to the overall noise level and thus can not be enhanced. Therefore, there is a desire to in-paint every pixel based on the analysis of the surrounding region to the dust (470). In the case where the enhancement regions as defined in block 430 are of good quality, those pixels as well may contribute to the in-paining. Otherwise, they are excluded form the calculations. The decision may rely on the distance of the pixels to the OPAQUE ones, of the minimum level of OPACITY that was used to restore the pixels in block 430. The larger the OPACITY, the smaller such pixels may be relied on in the inpainting process.

Figure 4A:
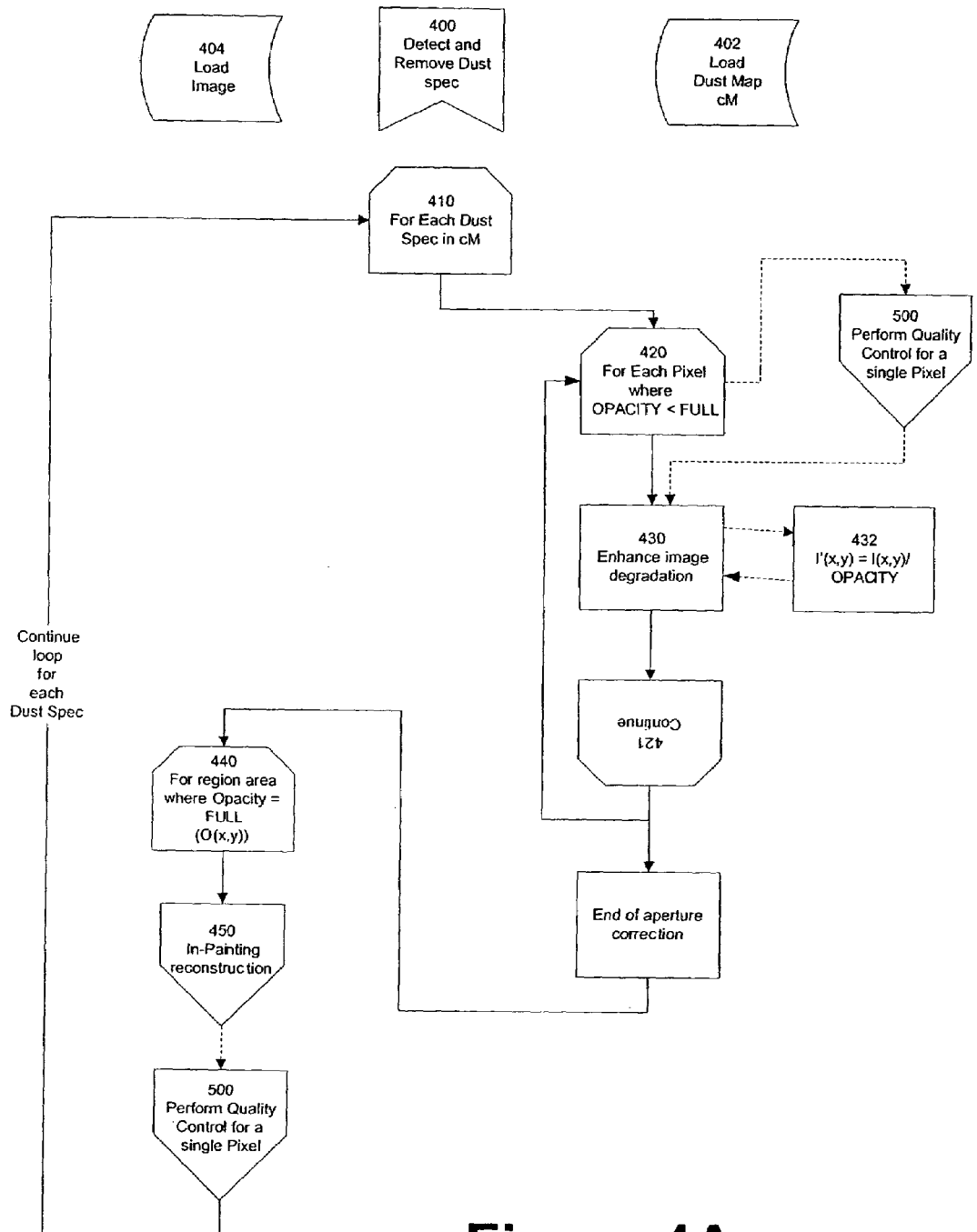
FIG. 4a illustrates a procedure for detecting and removing dust from images in accordance with a preferred embodiment.
Figure 4B:
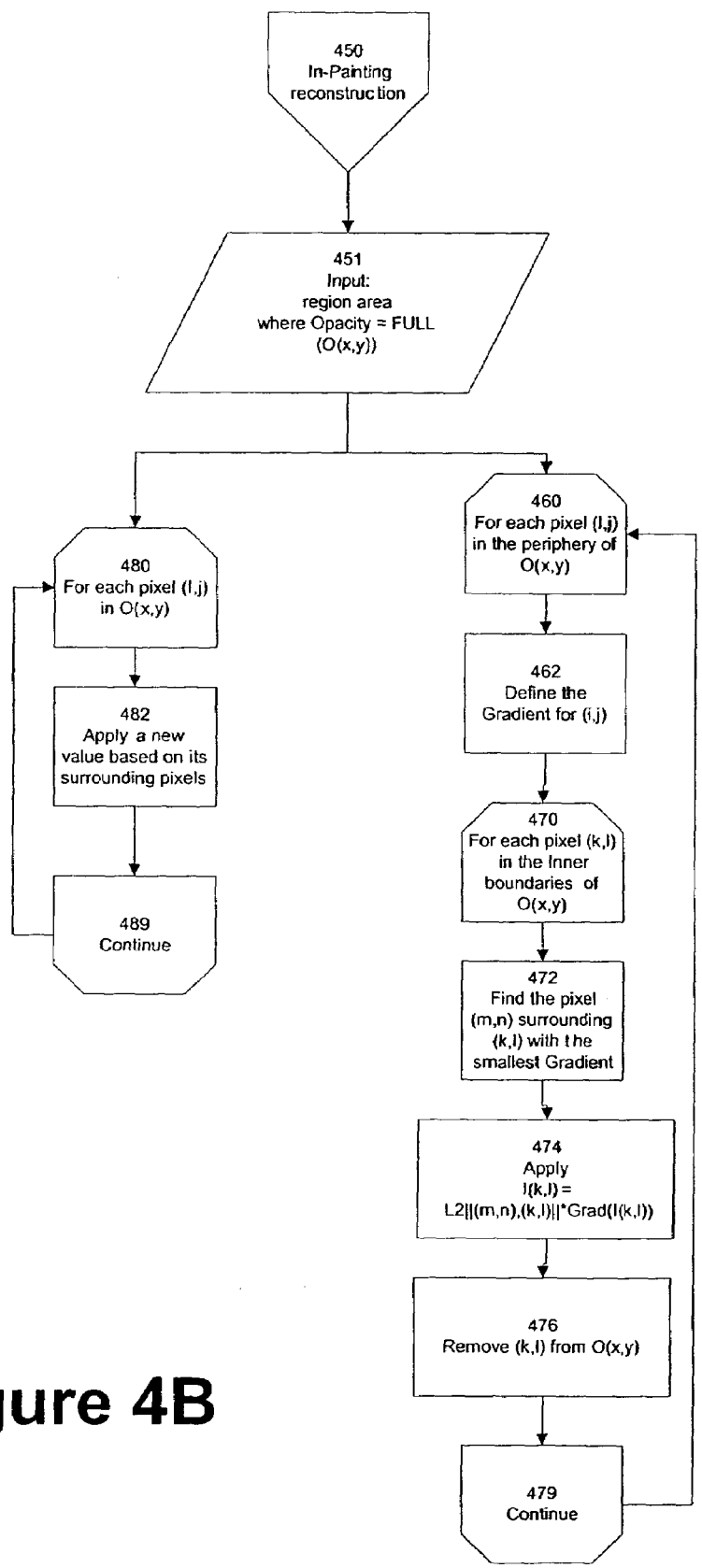
FIG. 4b illustrates reconstruction in-painting of dust regions.

FIG. 4b illustrates the a certain embodiment of the in-painting process. In general, each pixel in the obscured region, 480, is to be filled, 482, based on its surrounding pixels. In this specific embodiment, the pixels are filled in based on information of the surrounding non affected pixels. This specific algorithm takes into account that the pixels closet to the periphery has a better chance to be anticipated by the external pixels. Therefore the process is done form the outside inwards.

Figure 4C:
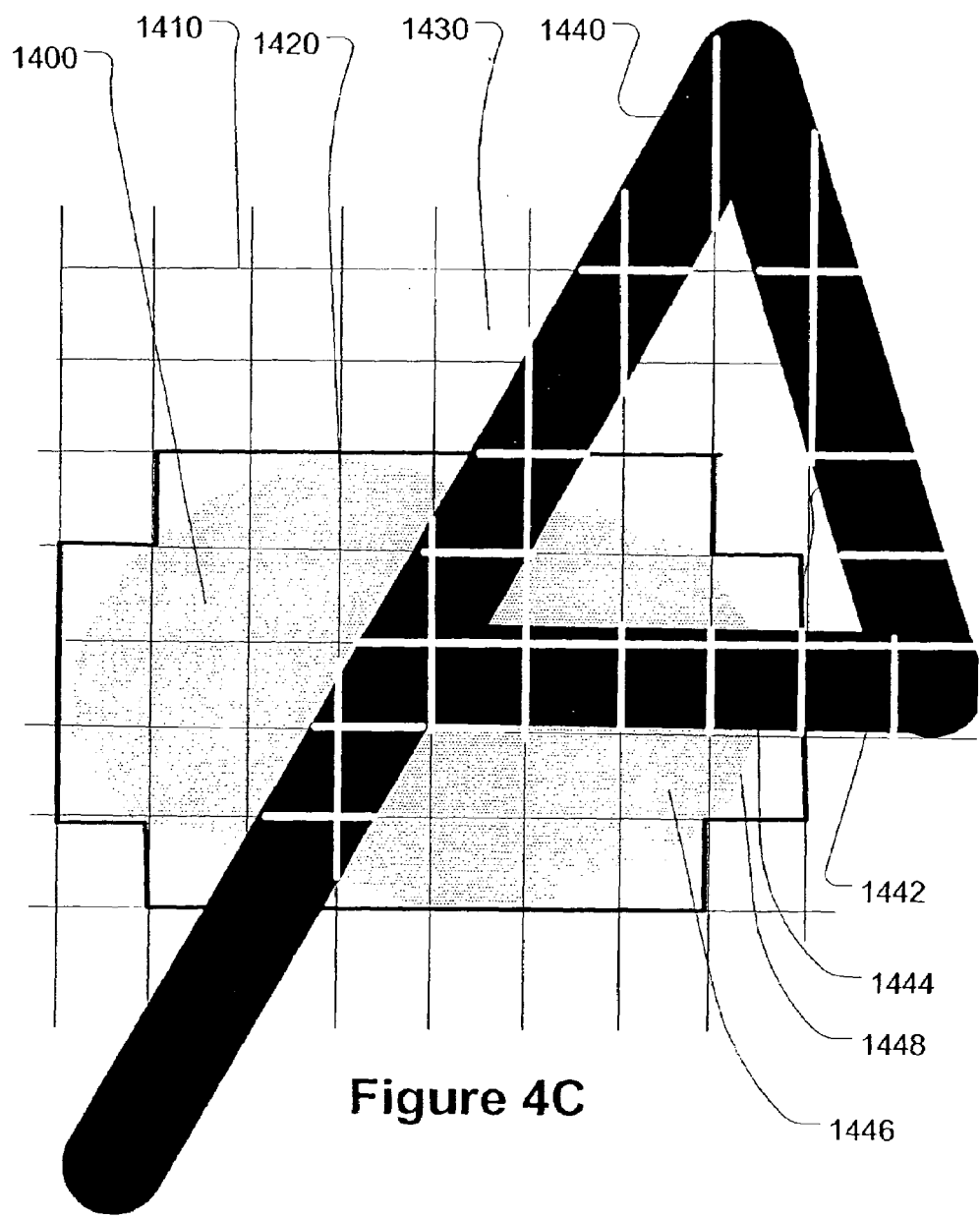
FIG. 4c illustrates the occurrence of dust in a picture with high edge information.
Figure 4D:
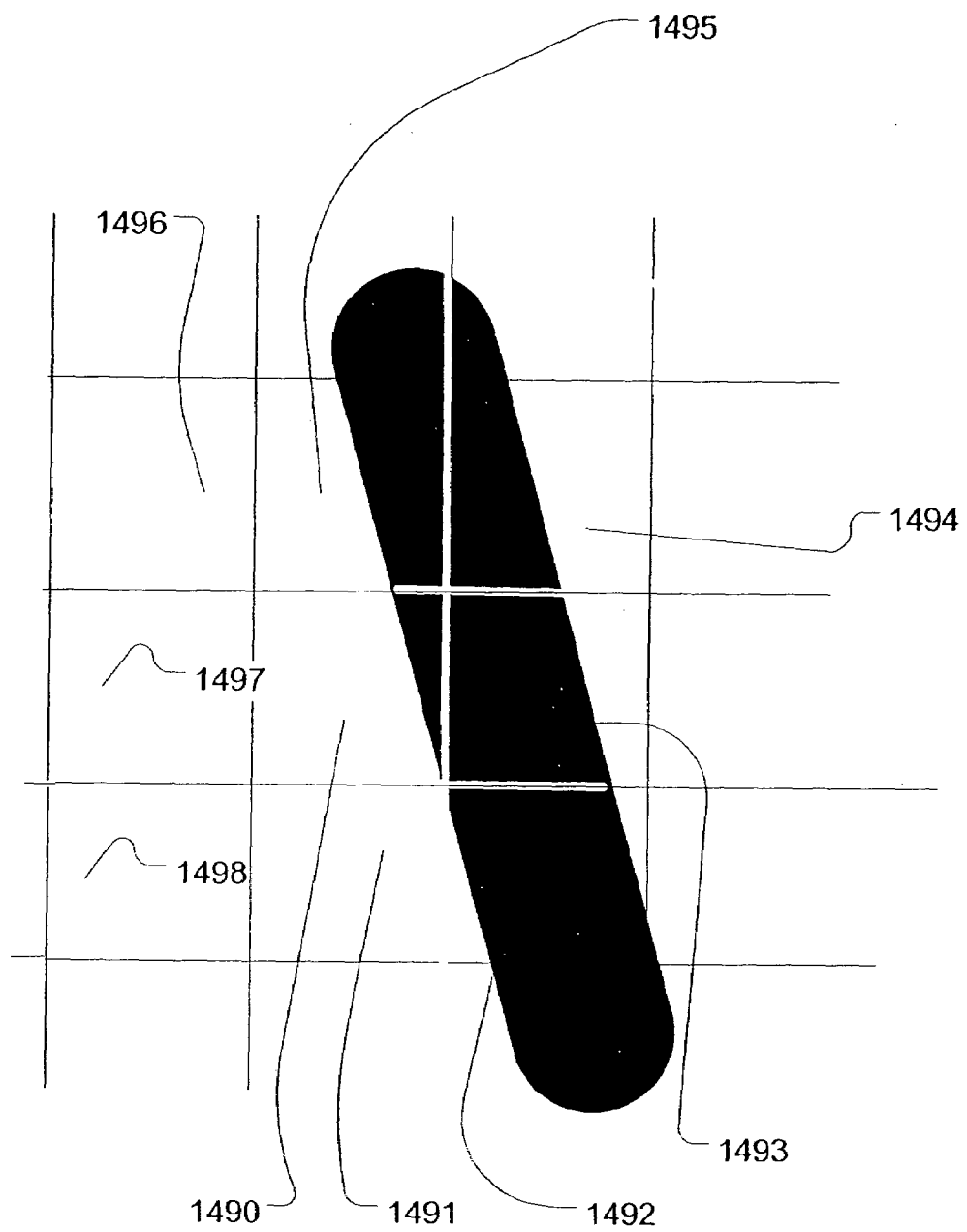
FIG. 4d illustrates the numerical gradient in an image.

This process of spiraling inwards is also depicted in FIG. 4d. In it, given a dust spec 1400 in a grid 1410 the dust is taken a digital form, of the surrounding bounding area 1420. External pixels such as 1430 are not part of the dust region, while internal ones such as 1450 are. An algorithm that works on the periphery moving inwards as defined in FIG. 4b blocks 470 is depicted in FIG. 4d as follows: In the first round all peripheral pixels, numbered form 1 to 20 are being operated on as defined in FIG. 4b, block 474. After that, all of the above mentioned twenty pixels, as defined in FIG. 4D Block 1460 are removed, according to block 476 of FIG. 4b, form the region leaving a smaller dust spec of shape 1470. This modified dust spec, has a different set of peripheral pixels numbered 21-31. After removing those pixels by the in painting process, block 467, a smaller dust kernel as depicted in 1480 is left with only three pixels 34, 35 and 36.

The process of filling in the pixels need not be spiral. In a different alternative, the process follows the pattern of the region surrounding the dust. For example lines and edges, or other high frequency information are being filled in prior to filling in the smooth regions. This approach will prevent unnecessary blurring due to the in-painting process.

A preferred embodiment the criteria for the chosen value can be based on marinating the overall gradient around the pixel, 462. The justification is that in the case of a steep edge, it is not advisable to copy information for the surrounding pixels with the edge value. By doing so, the in painting process will maintain any high frequency information in the picture such as lines and edges.

Figure 4E:
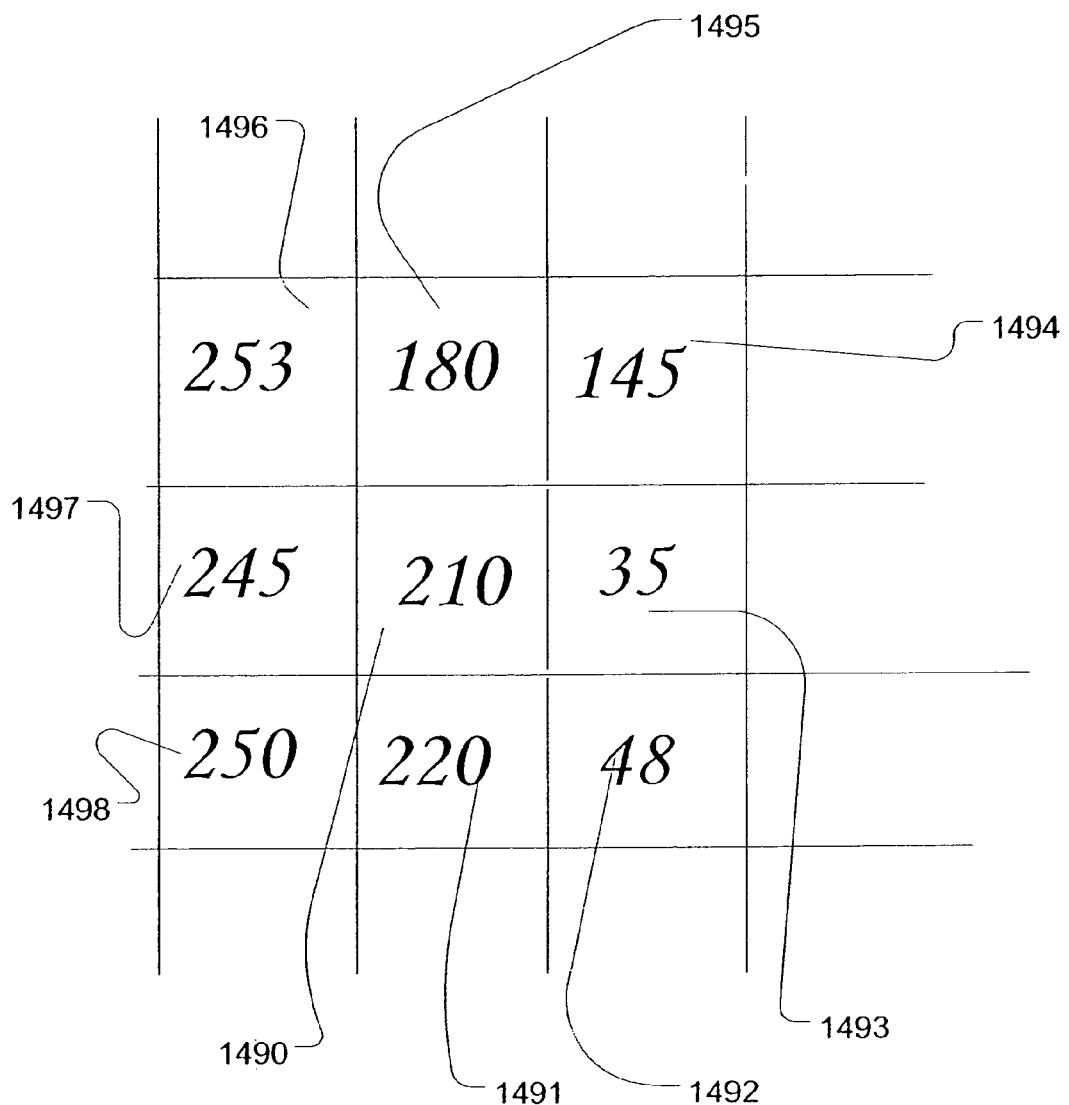
FIGS. 4e-4f illustrate a spiral procedure of in-painting from the periphery inwards.
Figure 4F:
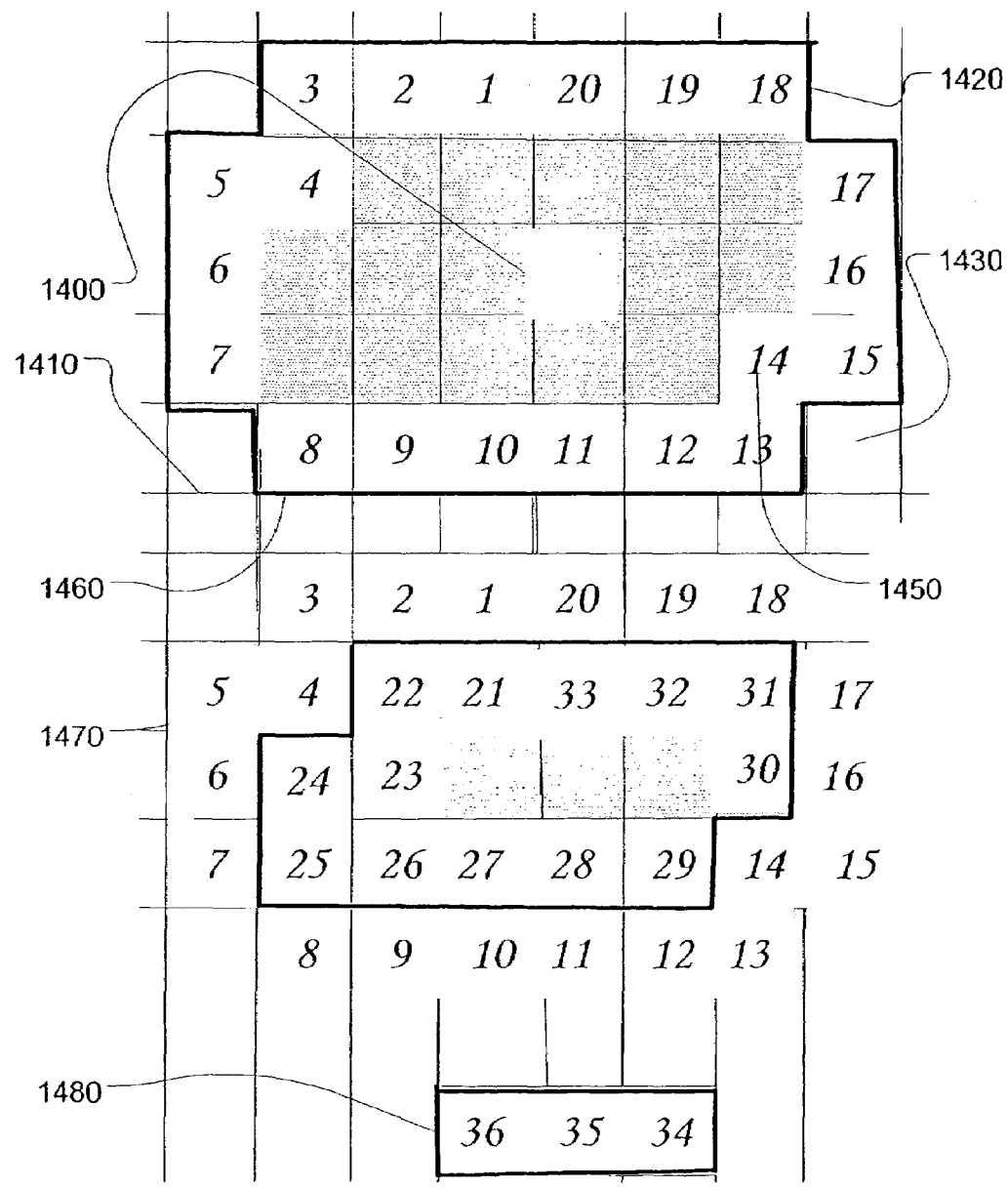

An illustration of that is given in FIGS. 4c, 4d and 4e. Referring to FIG. 4c, the same dust 1400 as in FIG. 4b with the bounding box 1420 on a grid 1410 is obscuring a picture including high frequency data such as the letter A, 1440. By taking a small section of based on 9 pixels as depicted in FIG. 4d pixel 1490 is surrounding by 8 pixels 1491, 1492, 1493, 1494, 1495, 1496, 1497, 1498.

In a simplification, each pixel receives the average value between the black and white regions. This is depicted in FIG. 4e. In this case, the pixels 1490 and its surrounding 8 pixels 1491, 1492, 1493, 1494, 1495, 1496, 1497, 1498. have a digital value of 21, 220, 250, 245, 253, 180, 145 and 35 respectively. It is clear that the best value of pixel 1490 will come form its surrounding pixels with the smallest gradient. Because in practice the value of pixel 1490 can not be determined, but is the center of the in painting, the value of the gradient will be based on the value of the gradients of the pixels around it and extrapolated to this pixel.

In this specific example, the differential horizontal gradient between pixels 1497 and 1493, is the largest while the gradient vertical gradient of 1495 and 1491 will most likely be the same. Therefore, a preferred value of 210 will be based on the extrapolated average of the two gradients of its top and bottom pixels.

Figure 500 describes a tool that may be used in various stages of the process, namely quality control. This process can be called from the main workflow (FIG. 1) the creation of the dust map (FIG. 3) or the image restoration and enhancement (FIGS. 4 and 4-a respectively). The purpose of this took is to perform the necessary quality check to assure that pixels will not be wrongly classified, nor mistakenly corrected when they should not.

Figure 8:
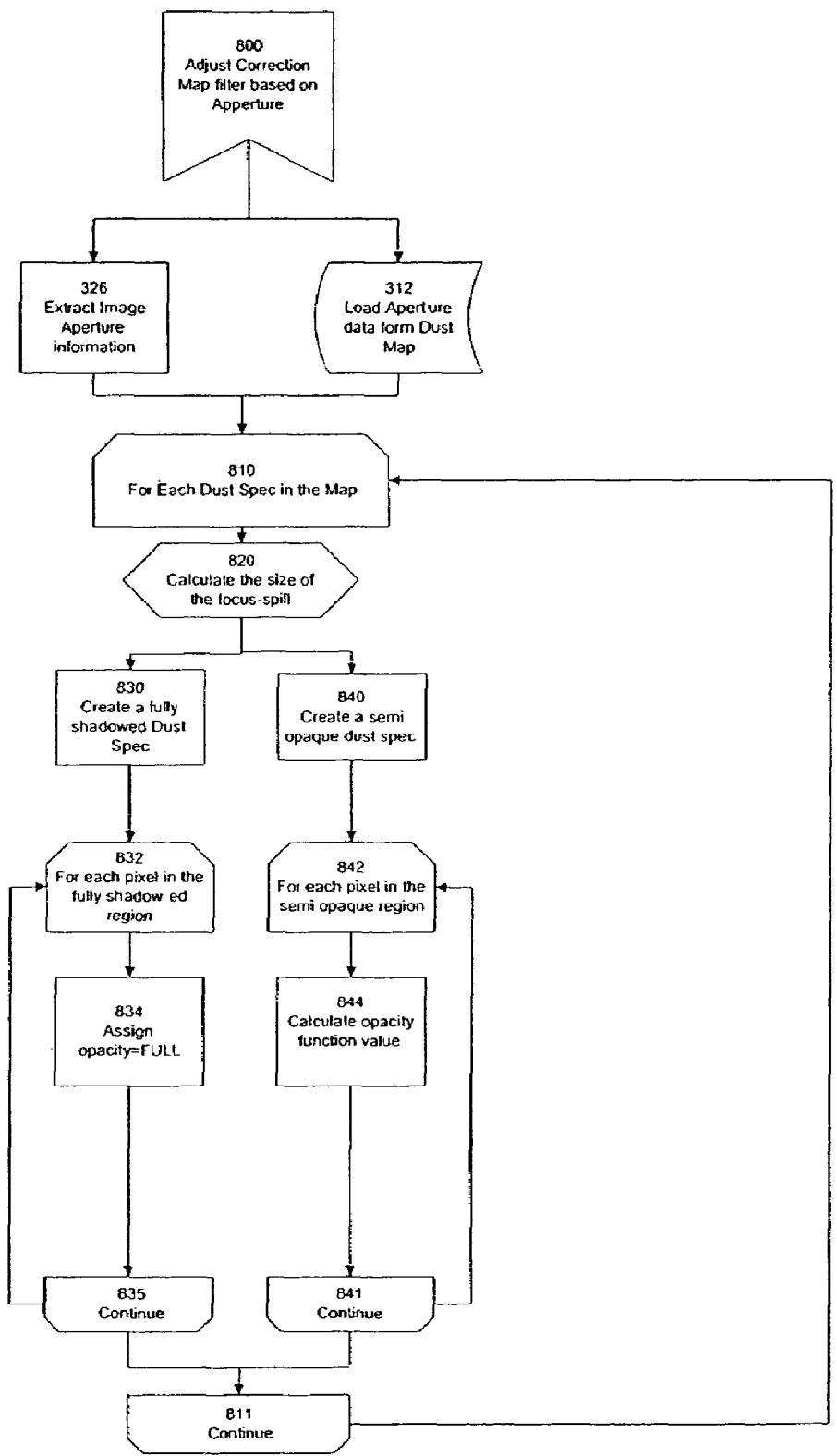
FIG. 8 illustrates an adjustment of the dust map based on aperture.

The quality control test can include: For a pixel in an image which belongs to a potential dust (510). In case the image was not yet correlated with the dust (300) this process should then be done. The next step is to check whether the pixel belongs to a dust region or not. For example, in a small aperture the region behind the dust should be close to if not totally obscured. If not (530 NO), there is a remaining desire to revive the dust map (550) or the image does not correspond to the dust map. This can happen when the image is form a different time, or from a different acquisition device. In this case, the software will create a new dust map (200) to correspond to the new dust or lack thereof, or inform the user that it can not correct this image. In case where there is not enough information (530 MAYBE), there is no conclusive evidence to reject the correlation and thus the process continues (580) with no action. In the case that the image displays information that may concur with the dust map, the software may continue (580) or prior to that, enhance the likelihood in the dust map (200) that the region is indeed dust. FIG. 8 describes the adjustment of the dust map to the image acquisition parameters based on the aperture. Simplifying, the closed the aperture is, the crisper and more noticeable the dust is. In other words, for example images taken with an f-stop of f-32, the dust will be very prominent and opaque, while the same image taken at f-2.8 may display no visual degradation of the image. The correction of the image should take that information into account, to prevent over correction of the dust artifact.

The acquisition information and the corresponding dust map default setup are extracted in blocks 326 and 312 respectively. Then, for each dust spec in the image 810, the size of the region that is still obscured by the dust is calculated, as defined by mathematical model. In some cases, when the aperture is very open, this region may decline to 0. In others, where the aperture is still very close, the size may be close to the size of the dust. Alternatively, This step, 820, may be done as a preparation stage, and kept in a database, which can be loaded.

The process then splits in two. The fully obscured region will be marked in 834 pixel by pixel 832 in a loop 834, 835 and will be treated by the in-painting process as defined in FIG. 4-a. A semi opaque dust map, is created in the loop 840, 841 for each pixel. Each of the pixels 842, is assigned an PCAPITY value 844, based on the mathematical model as described previously in FIG. 7a-4d. The dust spec that is only partially attenuated will go through a inverse filtering of the information already there, as described in FIG. 4 block 430, with a specific embodiment in block 432. The process of the inverse filtering may take into account the signal to noise ratio to avoid enhancing data which is not part of the original image. For example, the region around the dust may have a over-shoot similar to a high pass filter, which may manifest itself in the form of an aura around the dust. This aura should to be taken into account before enhancing the regions.

Figure 9:
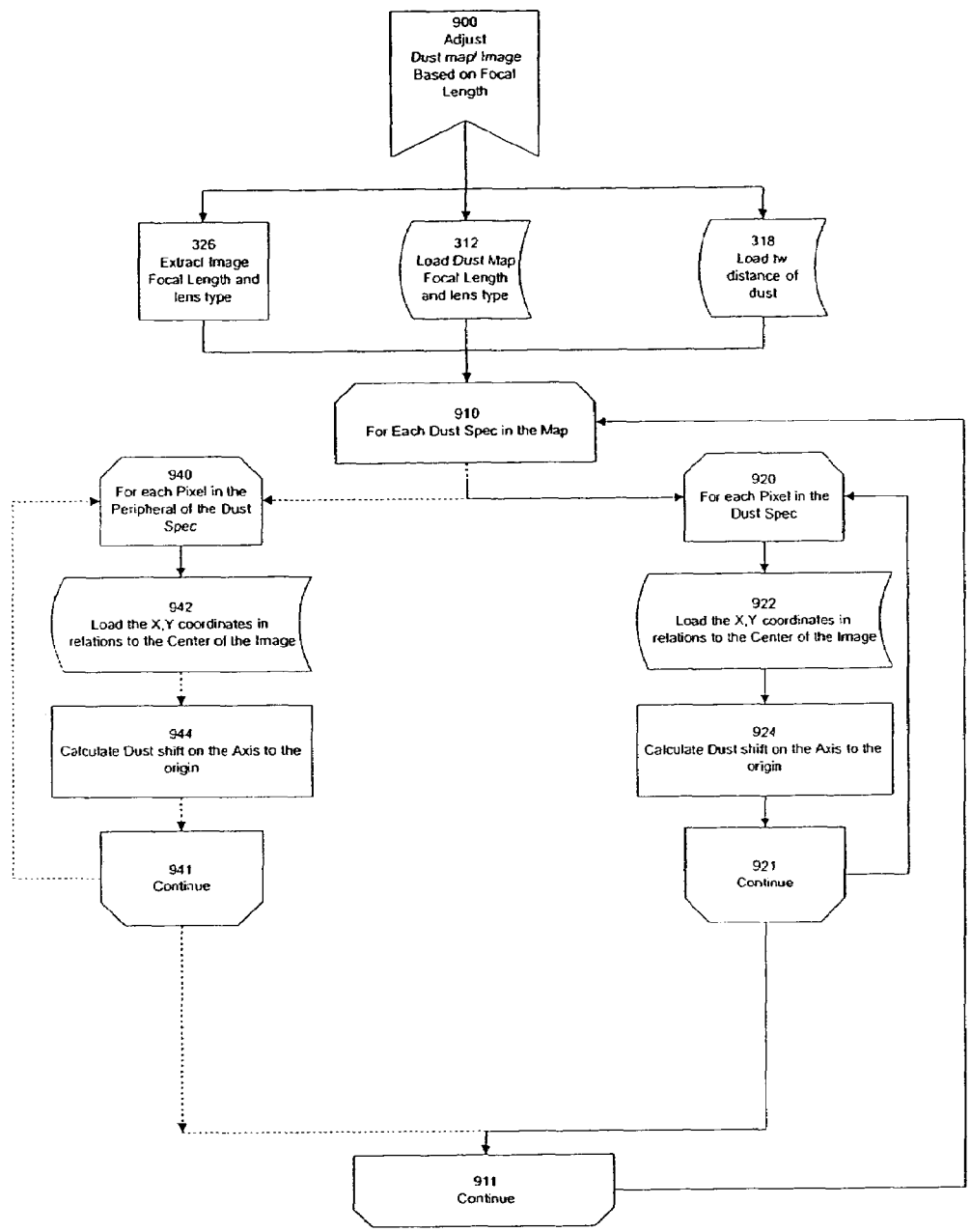
FIG. 9 illustrates an adjustment of a dust map based on focal length.

FIG. 9 describes the adjustment of the Dust Map based on the Focal length, and the specific lens. The scientific background is explained in FIGS. 7e-7f. As described before, the shift of the dust spec as a function of focal length for a specific lens is a function of equation (13 the thickness of the window–tw, which is constant for a given camera and exit pupil position–Pe which varies based on the lens system and the variable focal length in case of a zoom lens. Given an image and a dust map, the pertinent information is loaded, as described in FIG. 3, namely the focal lens and lens type of the camera, 326, the focal length and lens type in the dust map 312 and the camera distance of dust to the sensor 318.

The process then goes through all knows dust specs in the image 910 and calculates the shift of the dust as explained in FIG. 7a-7e. The coordinates of the pixel are calculated from the center of the optical path, 922, and the shift is calculated 924. Alternatively to going through each pixel, in order to speed the process, only the periphery of the dust spec can be calculated and the rest will be filled in. Moreover, because the shift is a function of the location (x,y) of the dust, in the case where dust is far enough from the origin, the dust shape will not change. It is then sufficient to calculate only a shift of a single point and displace the entire dust spec accordingly. The regions, which are only partially attenuated due to the change in aperture, may be calculated in this stage 940, 941, if calculated already as illustrated in FIG. 8, or alternatively, the displacement can be calculated first as explained in blocks 942, 944.

In some cases, it is impossible to get the data on the exit pupil, nor the distance the dust is from the sensor. Such cases may be when the application has no a-priori knowledge of the camera or the lens that was used.

It is still possible in those cases to create a reasonable dust map, by empirically reconstruction the parameter based on analysis of the images, the shift in the dust and the falloff of the dust edges. Such techniques are defined in FIGS. 10 and 11 defining the process of estimating, based on empirical data, the values of the parameters in the formulae that defines the change in dust as a function of change in aperture.

This process can be useful in the case that the software has no a-priori knowledge of the extracted parameters of the camera or lens that are used to convert the acquired image and the dust map image into the same known space. In an alternative embodiment, this technique can also be used to extract optical parameters, similar to methods done in a controlled laboratory settings such as using an optical bench of a lens regardless of the desire to remove dust artifact from an image. Alternatively this process can be used with partial knowledge, such as the shift of a single dust to evaluate the transposition of all dust specs in the image.

Figure 10:
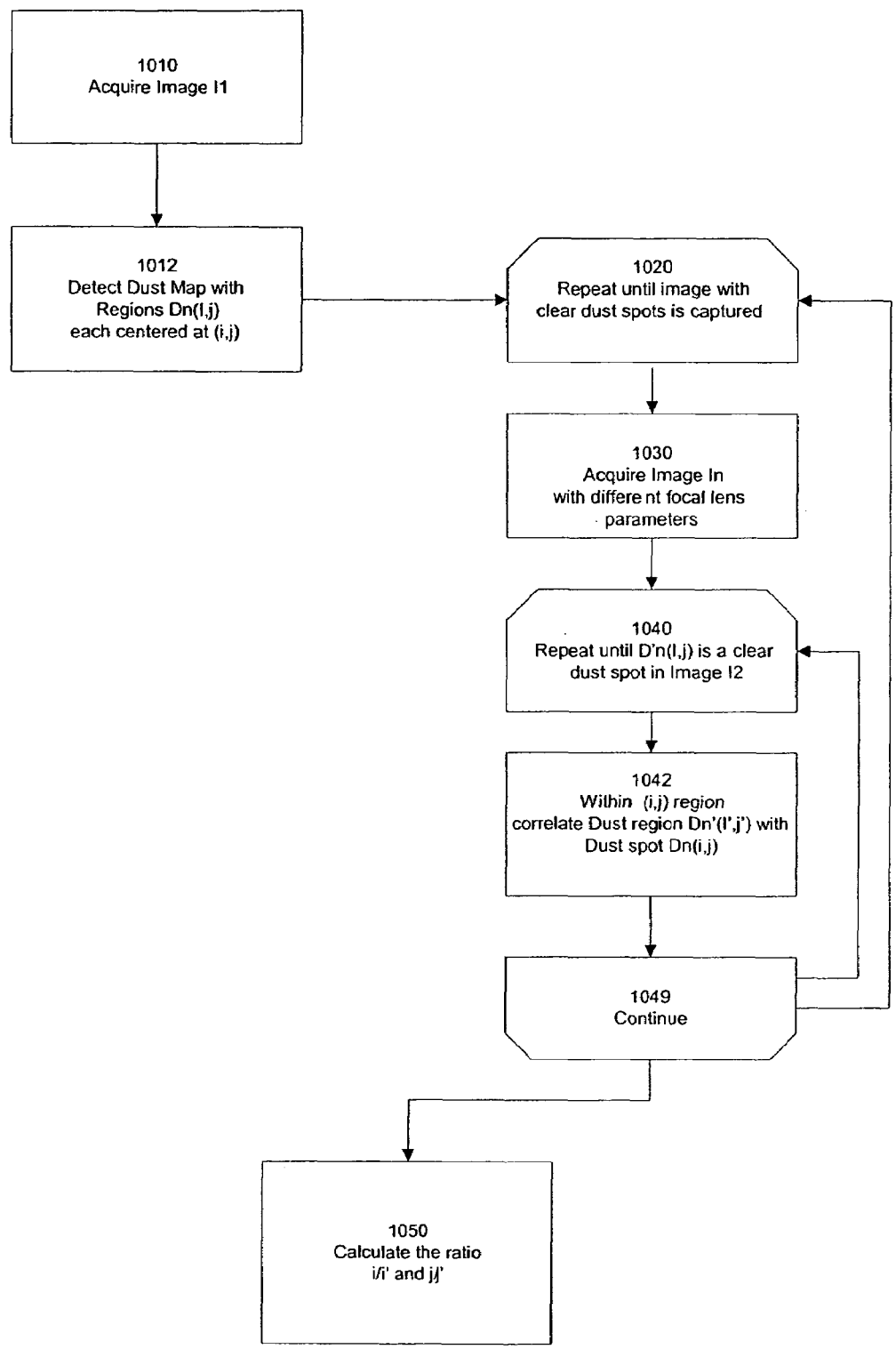
FIG. 10 illustrates a process of estimating based on empirical data the values of the parameters in the formulae that defines the change in dust as a function of change in focal length.

FIG. 10 Defines the process of creating the mathematical formulae based on empirical data to parameterize the change in dust as a function of change in focal length. In general, a proposed embodiment relies on the fact that when a dust if found, a pattern matching can be applied to find the shift in the dust. Based on this information, $$\frac{t_w}{P_e}$$

can be calculated as defined in Equation 13-a. If $t_w$ is known then Pe can be calculated as recited in equation 1-b.

Specifically, in a preferred embodiment, an image is acquired, 1010 and a dust map is calculated 1012. A second image is captured, 1030 with a different focal length than the first image, and a dust map is calculated 1032. The process repeatedly tries to find two dust spots in the two dust maps 1040. If no dust specs are correlated the process is repeated for consecutive images, 1020.

The process of finding dust specs is calculated by applying a local correlation to each of the dust specs. Preferably, based on Equation 13-a, the further the dust is from the center, the better the precision is.

When two specs are determined to be from the same dust spec the disparity between the specs is calculated 1042. The ration between the shifted pixels is calculated. This ratio is the numerical empirical estimation of $t_w$ in equation 13-a. Moreover, if the distance of the dust to the sensor is known, the Exit pupil of the lens can be calculated based on the same equation.

Figure 11:
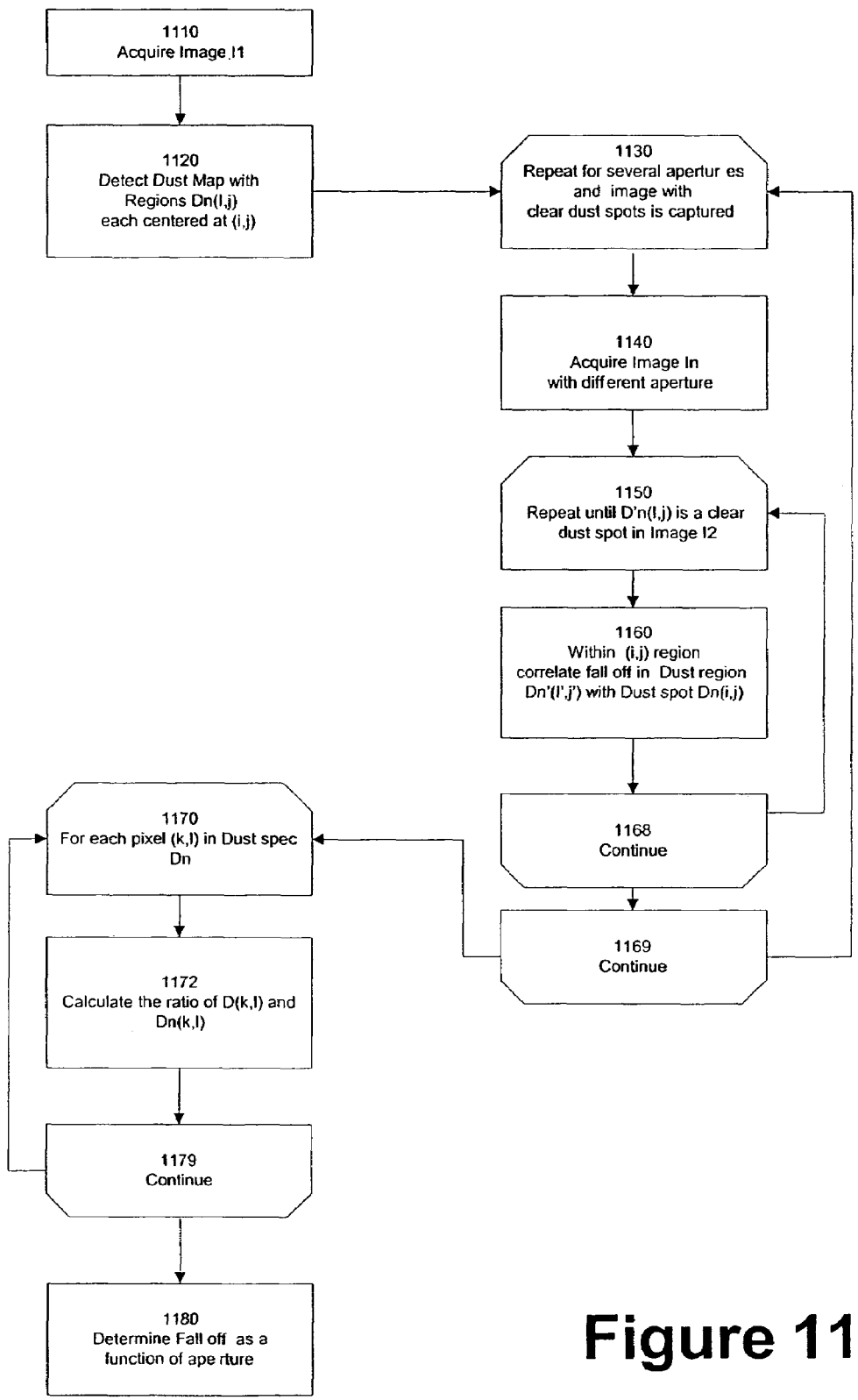
FIG. 11 illustrates a process of estimating based on empirical data the values of the parameters in the formulae that defines the change in dust as a function of change in aperture.

FIG. 11 Defines the process of estimating based on empirical data the values of the parameters in the formulae that defines the change in dust as a function of change in aperture The process is similar to the one described for estimation of the focal length, albeit the fact that the parameters calculated are different.

Specifically, a first image is acquired, 1110 and dust is detected, 1120 in this image. If the image is not appropriate for detecting the dust, or if the probability is low for the dust regions, this image is rejected for this purpose and another image is chosen. For the empirical comparison, a second image is captured 1140, or alternatively a set of images 1130, all with varying aperture, to enable acceptable sampling set. The process then looks for a detected dust region with high level of probability. In the case that all other parameters are similar except the aperture, the process can search for dust regions in the same coordinates that the original image dust regions were found. The dust regions of the two or more images are correlated, 1160. The process continues for a sufficient amount of dust regions, 1168, which in some cases can even be a single one, and sufficient amount of images, 1169, which can also be, depending on the confidence level, a single image. Once the dust regions are correlated 1160, the fall off due to the change of aperture is calculated, 1172, on a pixel by pixel basis, 1170, for every pixel in a dust region, 1179. Based on this information, the fall off function is calculated. 1180. In a preferred embodiment, the fall off function is determined as a function of the distance of a pixel from the periphery of the dust, as well as the aperture.

Alternatively, the dust specs may also be determined by trying to correlate the dust spec in the map to the acquired image. Such correlation can be performed within a reasonable window size or even on the diagonal line between the dust and the center of the optical path, in the direction that the dust may move. By gaining knowledge on the movement of a single dust spec, as explained in formulae 13a-13d, all other dust specs shift can be determined.

It is also possible to determine whether the camera should be physically cleaned based on analysis of the dust in the camera and the specific dust patterns. This illustrated in the flowchart of FIG. 12. An example will be that certain width of dust will not allow correct in-painting based on the surround. Another example will be the overall number of dust specs or the overall relative area that the dust covers. The input for such analysis is a dust map, 1200. This map can be similar to the dust map generated in block 200, or any other representation of a dust map or a calibration map, generated automatically or manually by the photographer. Such analysis need not be performed for every image. A process, 1210 determines whether to perform such analysis. Examples to trigger this process are the time since the last analysis, change of lenses, which may create the introduction of dust, or message form the quality control of dust map, as defined in FIG. 5 block 500, that the dust has shifted or that the dust no longer corresponds to the map. In general, the any changes in the dust structure may be a justification to trigger the analysis process. When no analysis is desired, 1212, the process terminates. Otherwise, the analysis is performed, 1220. The analysis is performed for each dust spec individually, 1130, and then the results are accumulated for the whole image. For each dust region, 1140, some parameters are being extracted, including, but not limited to Area of dust region; Maximum width of dust region; the distance between dust region and neighboring regions;

movement of dust region form last analysis; occurrence of new dust specs since last analysis; etc. Following this analysis, the results are summarized to include such data as—the overall area of dust, in size and in percentage for the entire image; the largest width of dust; the largest area of dust spec; changes in area of dust since last analysis and changes of dust particles since last analysis. In an alternate embodiment, either automatically or based on the photographers preference, this analysis may be displayed or saved in a log file for future reference, 1221. Each of the aforementioned criteria may have a acceptability threshold value. This threshold value is determined empirically by the manufacturer in terms of the maximum acceptable dust that can be corrected in software. Alternatively, this data may be adjusted to by the photographer based on her tolerance level to dust. If any of the parameters exceeds an acceptable threshold, the user is informed, 1290, that the camera should be manually maintained and cleaned up.

Alternatively, 1285, this same process may be used as a tool to inform the user of changes in the dust. Such information is particularly important in the case that the dust correction algorithm is based on the creation of a calibration image. In this case, the analysis will be used to inform the user that a new calibration image should be acquired to support the correction of dust in future images.

Figure 12:
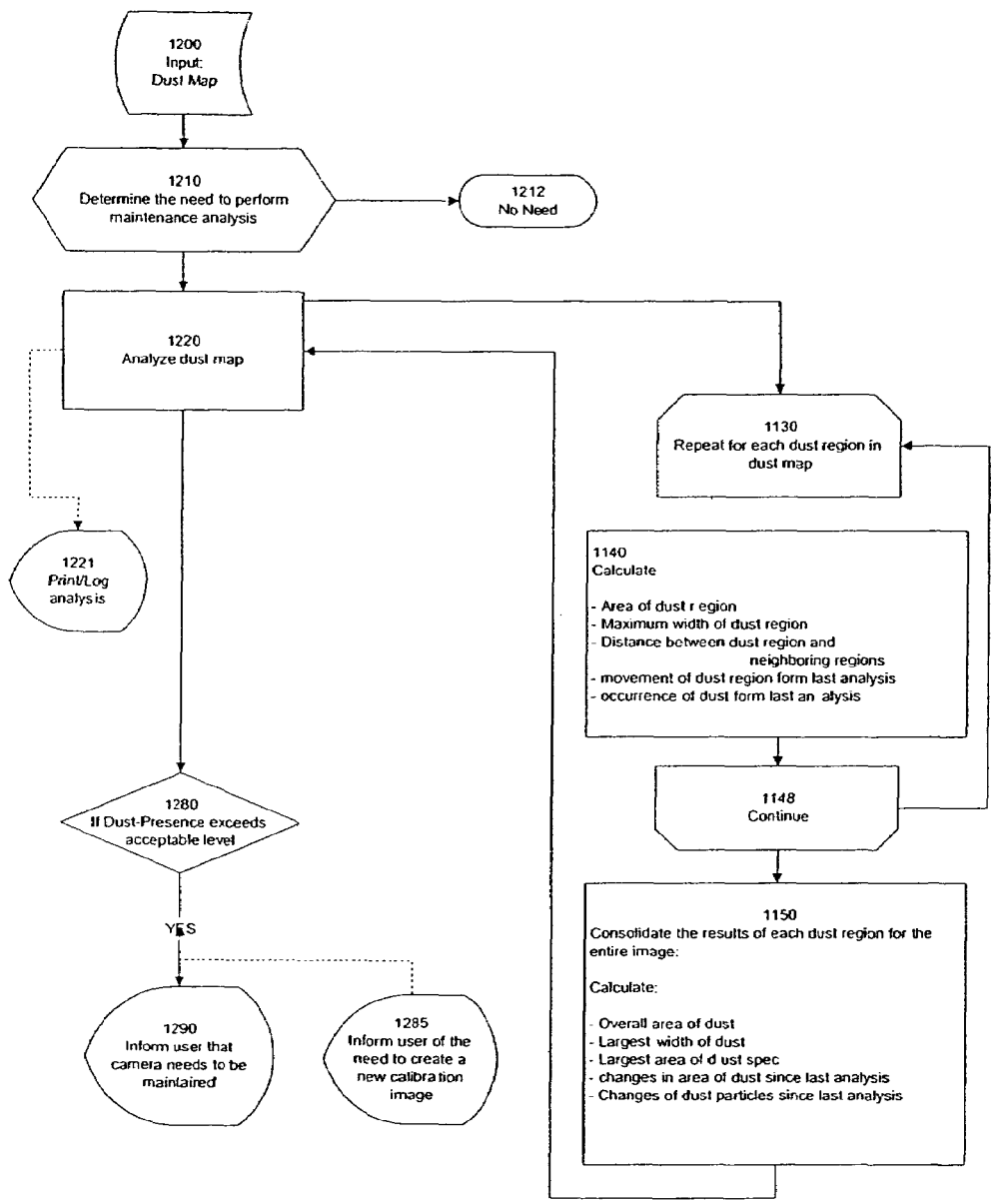
FIG. 12 illustrates a further process of in accordance with another embodiment.

Alternatively, the process of analysis described above may also be incorporated in a maintenance procedure, where the camera, after being cleaned up will perform an auto-test, as described in FIG. 12, to verify that the camera now is indeed clean. In such cases, the threshold parameters are of course substantially more restrictive and demanding, to assure high quality maintenance.

There are many alternatives to the preferred embodiments described above that may be incorporated into a image processing method, a digital camera, and/or an image processing system including a digital camera and an external image processing device that may be advantageous. For example, an electronic circuit may be designed to detect maximum and minimum dust detection probability thresholds while acquiring pixels in an image (see also U.S. Pat. No. 5,065,257 to Yamada, hereby incorporated by reference). Such a circuit can produce signals that may be used in processing to eliminate regions, which lie outside the expected range of signal values due to the presence of dust particles or similar optical defects, or alternatively to accept, maintain or eliminate regions as dust artifact regions based on whether a probability determination exceeds, high or low, a certain threshold or thresholds. A technique may be used to detect and provide a remedy for the effects of dust on a digitally-acquired image (see also U.S. Pat. No. 5,214,470 to Denber, hereby incorporated by reference). An image may be recorded within a digital camera or external processing device such as may be signal coupled with a digital camera for receiving digital output image information or a device that acquires or captures a digital image of a film image. The digital image may be compared with the film image, e.g., through a logical XOR operation, which may be used to remove dust spots or blemishes picked up in the acquisition of the digital image from the film image.

Multiple images may be processed and stationary components, which are common between images, may be detected and assigned a high probability of being a defect (see also U.S. Pat. No. 6,035,072 to Read, hereby incorporated by reference). Additional techniques, which may be employed to modify defect probability, may include median filtering, sample area detection and dynamic adjustment of scores. This dynamic defect detection process allows defect compensation, defect correction and alerting an operator of the likelihood of defects.

Dark field imaging may be employed to determine the location of defects in digital images from digital cameras or film scanners (see U.S. Pat. No. 5,969,372 to Stavely et al., and U.S. patent application 2001/0035491 to Ochiai et al., each hereby incorporated by reference). A normal imaging of a object with normal illumination may be followed by a second imaging using different wavelengths, e.g., infrared illumination. Dust, fingerprints, scratches and other optical defects are typically opaque to infrared light. Thus the second image produces an image with dark spots indicating the position of dust particles or other defects.

A process may involve changing any of a variety of extracted parameters (see elsewhere herein), angle of sensor relative to image plane, distance of image plane or sensor from dust specks (e.g., on window of sensor), etc., and imaging a same object with the digital camera. A comparison of the images reveals with enhanced probability the locations of dust artifact. In a camera application, the unique location of the actual dust relative to the object and to the image plane provide information about extracted parameter-dependent characteristics of dust artifact in the images. The analysis for the digital camera application depends on the "transmission"-based optical parameters of the system, i.e., the fact that light travels from a scene through the camera lens and onto the camera sensor, and not involving any substantial reflective effects. It is possible to make determinations as to where the dust actually is in the system by analyzing multiple images taken with different extracted parameters, e.g., on the sensor window, or in an image of an original object which itself is being images such as in film imaging.

In a scanning application, this technique can be use the face that a speck of dust will cast a shadow of a different color, geometry location, etc. with changes in extracted parameters, e.g., with a different color with increasing elongation of the shadow for each parallel row of pixels (a "rainbow" shadow, as it were). Multiple scans taken from various angles of illumination may be employed to produce an image which identifies dust defects from their shadows and the colors thereof (see U.S. Pat. No. 6,465,801 to Gann et al. and US patent applications 2002/0195577 and 2002/0158192 to Gann et al, hereby incorporated by reference). A linear scanning element moves across a document (or the document is moved across the scanning element) and an image of the document is built up as a series of rows of pixels. This differs from the physical configuration of a camera in which a shutter illuminates a X-Y sensor array with a single burst of light. In both cases, though, dust may lie close to the imaging plane of the sensor.

Technique may be applied as part of a photofinishing process to eliminate blemishes on a film image obtained by a digital camera (see also US patent application 2001/0041018 to Sonoda, hereby incorporated by reference). Such techniques may import previous acquired information about defects in images from a blemish detection procedure. A technique for correcting image defects from a digital image acquisition device such as a digital camera may involve repeated imaging of an object or other image, where each successive image-acquisition involves different properties or extracted parameters or meta-data related properties, such as variable angles of incidence or variable lighting or contrast parameters, and the results of these repeated scans may be combined to form a reference image from which defect corrections are made (see also US patent application 2003/0118249 to Edgar, hereby incorporated by reference).

A decision on whether a defect in a image acquired by a field-based digital camera is to be corrected or not may be based on a balancing of considerations. For example, the likely damage to surrounding defect-free portions of the image may be balanced against the likelihood of successfully achieving correction of the defect.

Image processing means may be employed where the detection or correction of defects in a digital image may be based solely on analysis of the digital image, or may employ techniques directly related to the image acquisition process, or both. Anomalous image regions may be determined based on the difference between the gradient of an image at a set of grid points and the local mean of the image gradient (e.g., see U.S. Pat. No. 6,233,364 to Krainiouk et al., hereby incorporated by reference). Such technique can reduce the number of false positives in "noisy" regions of an image such as those representing leaves in a tree, or pebbles on a beach. After determining an initial defect list by this means, the technique may involve culling the list based on a one or more or a series of heuristic measures based on color, size, shape and/or visibility measures where these are designed to indicate how much an anomalous region resembles a dust fragment or a scratch.

Techniques and means to correct scratches in a digitized images may employ a binary mask to indicate regions requiring repair or noise removal, and sample and repair windows to indicate (i) the region requiring repair and/or (ii) a similar "sample" area of the image (see also U.S. Pat. No. 5,974,194 to Hirani et al., hereby incorporated by reference). Data from a sample window may be converted to a frequency domain and combined with frequency domain data of the repair window. When a low-pass filter is applied, it has the effect to remove the sharp, or high-frequency, scratch defect.

Techniques and means of detecting potential defect or "trash" regions within an image may be based on a comparison of the quadratic differential value of a pixel with a predetermined threshold value (see U.S. Pat. No. 6,125,213 to Morimoto, hereby incorporated by reference). The technique may involve correcting "trash" regions within an image by successively interpolating from the outside of the "trash" region to the inside of this region.

Techniques and means to automate the removal of narrow elongated distortions from a digital image may utilize the characteristics of image regions bordering the distortion (see also U.S. Pat. No. 6,266,054 to Lawton et al., hereby incorporated by reference). User input may be used to mark the region of the defect, or automatic defect detection may be employed according to a preferred embodiment herein, while the process of delineating the defect is also preferably also performed automatically.

Techniques and means to allow automatic alteration of defects in digital images may be based upon a defect channel having a signal proportional to defects in the digital image (see also U.S. Pat. No. 6,487,321 to Edgar et al., hereby incorporated by reference). This allows areas of strong defect to be more easily excised without causing significant damage to the area of the image surrounding the defect.

Techniques and means may be employed to generate replacement data values for an image region (see also U.S. Pat. No. 6,587,592 to Georgiev et al., hereby incorporated by reference) Image defect may be repaired as facilitated by the replacement data. Moreover, the repairing of the unwanted image region may preserves image textures within the repaired (or "healed") region of the image.

Techniques and means may be employed to detect defect pixels by applying a median filter to an image and subtracting the result from the original image to obtain a difference image (see also US patent application 2003/0039402 and WIPO patent application WO-03/019473, both to Robins et al., each hereby incorporated by reference). This may be used to construct at least one defect map. Correction of suspected defect pixels may be achieved by replacing those pixel values with pixel values from the filtered image and applying a smoothing operation. User input may or may not be utilized to further mitigate the effects of uncertainty in defect identification.

Techniques and means for retouching binary image data which is to be presented on a view-screen or display apparatus may be employed to eliminate local screen defects such as dust and scratch artifacts (see also US patent application 2002/0154831 to Hansen et al., hereby incorporated by reference). The production of visible moiré effects in the retouched image data may be avoided by the replacement of small areas.

A digital video camera with sensor apparatus may incorporate a defect detecting mode (see also U.S. Pat. No. 5,416,516 to Kameyama et al., hereby incorporated by reference). The locations of detected defect pixels may be retained in the memory of the camera apparatus and replacement pixel values may be interpolated by processing algorithms, which convert the sensor data into digital image pixel values. Techniques may be employed to automatically detect and compensate for defective sensor pixels within a video camera (see also U.S. Pat. No. 5,625,413 to Katoh et al., hereby incorporated by reference). The camera may perform a dark current measurement on start-up when the camera iris is closed and by raising the gain can determine pixels which exhibit abnormally high dark current values. The location of these pixels is recorded in camera memory as a LUT with associated threshold brightness values associated with each pixel depending on its dark current value; defect compensation depends on input image brightness and ambient temperature.

An image pickup apparatus, such as a digital camera, may have a detachable lens (see also US patent application 2003/0133027 to Itoh, hereby incorporated by reference). The camera may incorporate a defect detecting section and a compensation section for sensor defects. Further the defect detection operation may become active when the camera lens is detached so that the user will not miss an opportunity to take a picture due to the operation of the defect detection process.

The techniques of the preferred and alternative embodiments described herein may be applied to printers and to imaging devices such as a digital cameras which incorporate a focusing lens system. A process may be employed for detecting and mapping dust on the surface of a photographic element (see also U.S. Pat. No. 5,436,979 to Gray et al., hereby incorporated by reference). This may be applied in the context of a verification procedure to follow a cleaning process for a range of photographic elements including film negatives and slides. Statistical information may be obtained and presented to an operator to allow control of the cleaning process. Detailed location information may be also recorded and/or correction means may be also provided for dust defects on a photographic element.

Techniques and means to create a defect map for a digital camera or similar imaging device may use an all-white reference background (see also US patent application 2002/0093577 to Kitawaki et al., hereby incorporated by reference). The location of any dust or scratch defects may be recorded in the memory of the imaging apparatus when the camera is in a dust detection mode and when a dust correction circuit is active any image data co-located with a defect may be corrected for the presence of dust by elimination, color correction or interpolation based on the surrounding pixels. Further, where the position of a dust defect changes with f-stop of the camera a list of dust locations corresponding to f-stop settings is pre recorded at the time of manufacturing in a LUT in the camera memory. Any effect of different focal length may be simplified to the effect of the change in dust due to magnification of the lens. In addition, techniques for dynamically obtaining a defect map based on the processing of a plurality of images may be employed with this technique.

Techniques may be also employed involving correcting for dust defects based on the geometry of said dust or of the camera. Further techniques may involve utilizing camera metadata to enhance the detection and correction processes for defects. Further techniques may involve alerting the user that the camera requires servicing due to excessive levels of dust contamination, or the fact that it is not only magnification but the actual lens that is mounted.

A method of filtering dust artifacts form an acquired digital image including multiplicity of pixels indicative of dust, the pixels forming various shapes in the image, may be employed. The method may include analyzing image information including information describing conditions under which the image was acquired and/or acquisition device-specific information. One or more regions may be determined within the digital image suspected as including dust artifact. Based at least in part on said meta-data analysis, it may be determined whether the regions are actual dust artifact.

A method may includes obtaining a dust map based on analysis of multiple images acquired by the same image acquisition device. The dust map may include regions of various shapes and sizes indicative of statistically recurring patterns associated with dust.

A method may further include analyzing the images in comparison to a predetermined dust map to establish the validity of the dust over progressions of time. The method may further involve mapping the acquired image to a predetermined default acquisition condition as a function of the lens type and the focal length that was used at acquisition.

A method may further include mapping a dust spec as depicted in the dust map and the suspected dust specs in the acquired image based on a calculated transformation of the dust as a function of the lens and the aperture, or other extracted parameter, used to acquire the image. The actual removal of dust artifacts from an image may include a step where missing data as obscured by the dust specs is regenerated and in-painted based on analysis of the region in the image surrounding the dust spec. The actual removal of the dust artifacts from the image may also include a step where deteriorated regions primarily in the periphery of the dust spec are enhanced and restored based on knowledge of the deterioration function. The actual image retouching may include both in-painting and restoration or either one of these operations, or another image correction technique as may be understood by those skilled in the art.

A method of detecting and removing dust artifacts may be performed in the acquisition device as a post-processing stage prior to saving the image. This method may further include an analysis of the image in its raw format immediately followed by the acquisition stage. The method of detecting and removing dust artifacts can be performed on an external device as part of a download or capture process. Such external device may be a personal computer, a storage device, and archival device, a display or a printing device or other device. The method of detecting and removing dust artifacts can be performed in part in the acquisition device and the external device.

A dust detection and/or correction technique may be applied post priori to a collection of images, or individually to images as they are added to a collection. The map may be generated a priori to the introduction of an image, or dynamically and in concurrence to the introduction of new images. The method may further include steps of providing a statistical confidence level as to the fact that a certain region is indeed part of a dust spec. The method may further provide tools to determine whether the acquisition device may benefit from some maintenance. A method may be employed that may be implemented as part of a digitization process, such as correcting defects on scanning device, whether flat bed or drum, whether for hard copy documents or for film digitization. A method may be further applied to other recurring image imperfections such as dead pixels on the sensor, burnt pixels on the sensor, scratches, etc. A method of automatically determining whether to recommend servicing a digital image acquisition system including a digital camera based on dust analysis may be advantageously employed. A method of calculating parameters of an optical system may be based on analysis of the dust. While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

Many references have been cited above herein, and in addition to that which is described as background, the invention summary, brief description of the drawings, the drawings and the abstract, these references are hereby incorporated by reference into the detailed description of the preferred embodiments, as disclosing alternative embodiments of elements or features of the preferred embodiments not otherwise set forth in detail above. A single one or a combination of two or more of these references may be consulted to obtain a variation of the preferred embodiments described in the detailed description above.

What is claimed is:

1. A method of automatically determining a need to service a digital image acquisition system including a digital camera with a lens assembly and electronic sensor array, the method comprising using a processor of the digital camera in:

determining a probability that pixels within one or more acquired digital images correspond to dust artifacts;

generating a master dust map describing physical manifestations of dust on the electronic sensor array based on the determining;

calculating a transformation of the master dust map to generate a manifestation of the master dust map that includes information describing dust location and appearance as a function of one or more optical parameters including exit pupil dimension of the lens assembly or distance of dust from a surface of the electronic sensor array that corresponds to a focal plane of the lens assembly, or both;

analyzing pixels within one or more further acquired digital images and updating the master dust map or the manifestation of said master dust map, or both, in accordance with the analyzing;

determining based on the updating whether a threshold distribution of dust artifacts is present within said one or more further acquired digital images; and indicating a need for service of the system, including a cleaning process, by notifying a system user when at least said threshold distribution is determined to be present.

2. The method of claim 1, wherein said one or more acquired images comprise one or more calibration images.

3. The method of claim 1, said threshold distribution being determined based upon an analysis of the ability of an automatic blemish correction module of said digital image acquisition system to reasonably correct such blemishes within said images.

4. The method of claim 1 wherein said one or more acquired images are acquired with specific acquisition setting comprising one or more of aperture, shutter speed, sensitivity, and subject matter.

5. The method of claim 4, wherein said specific acquisition settings are automatically determined in a specific calibration mode on said digital image acquisition system.

6. The method of claim 1, wherein said analyzing is based on defined time interval since last said analyzing.

7. The method of claim 1, wherein said analyzing is based on defined in relations with change of lenses.

8. A digital image acquisition system including a digital camera with a lens assembly, electronic sensor array, a processor and a memory containing code for programming the processor to perform a method of automatically determining a need to service the digital camera, the method comprising:

determining a probability that pixels within one or more acquired digital images correspond to dust artifacts;

generating a master dust map describing physical manifestations of dust on the electronic sensor array based on the determining;

calculating a transformation of the master dust map to generate a manifestation of the master dust map that includes information describing dust location and appearance as a function of one or more optical parameters including exit pupil dimension of the lens assembly or distance of dust from a surface of the electronic sensor array that corresponds to a focal plane of the lens assembly, or both;

analyzing pixels within one or more further acquired digital images and updating the master dust map or the manifestation of said master dust map, or both, in accordance with the analyzing;

determining based on the updating whether a threshold distribution of dust artifacts is present within said one or more further acquired digital images; and indicating a need for service of the system, including a cleaning process, by notifying a system user when at least said threshold distribution is determined to be present.

9. The system of claim 8, wherein said one or more acquired images comprise one or more calibration images.

10. The system of claim 8, said threshold distribution being determined based upon an analysis of the ability of an automatic blemish correction module of said digital image acquisition system to reasonably correct such blemishes within said images.

11. The system of claim 8 wherein said one or more acquired images are acquired with specific acquisition setting comprising one or more of aperture, shutter speed, sensitivity, and subject matter.

12. The system of claim 11, wherein said specific acquisition settings are automatically determined in a specific calibration mode on said digital image acquisition system.

13. The system of claim 8, wherein said analyzing is based on defined time interval since last said analyzing.

14. The system of claim 8, wherein said analyzing is based on defined in relations with change of lenses.

15. One or more digital storage media having processor-readable code embedded therein for programming a processor to perform a method of automatically determining a need to service a digital image acquisition system including a digital camera with a lens assembly, an electronic sensor array, and a processor, the method comprising:

determining a probability that pixels within one or more acquired digital images correspond to dust artifacts;

generating a master dust map describing physical manifestations of dust on the electronic sensor array based on the determining;

calculating a transformation of the master dust map to generate a manifestation of the master dust map that includes information describing dust location and appearance as a function of one or more optical parameters including exit pupil dimension of the lens assembly or distance of dust from a surface of the electronic sensor array that corresponds to a focal plane of the lens assembly, or both;

analyzing pixels within one or more further acquired digital images and updating the master dust map or the manifestation of said master dust map, or both, in accordance with the analyzing;

determining based on the updating whether a threshold distribution of dust artifacts is present within said one or more further acquired digital images; and indicating a need for service of the system, including a cleaning process, by notifying a system user when at least said threshold distribution is determined to be present.

16. The one or more digital storage media of claim 15, wherein said one or more acquired images comprise one or more calibration images.

17. The one or more digital storage media of claim 15, wherein said threshold distribution is determined based upon an analysis of the ability of an automatic blemish correction module of said digital image acquisition system to reasonably correct such blemishes within said images.

18. The one or more digital storage media of claim 15 wherein said one or more acquired images are acquired with specific acquisition setting comprising one or more of aperture, shutter speed, sensitivity, and subject matter.

19. The one or more digital storage media of claim 18, wherein said specific acquisition settings are automatically determined in a specific calibration mode on said digital image acquisition system.

20. The one or more digital storage media of claim 15, wherein said analyzing is based on defined time interval since last said analyzing.

21. The one or more digital storage media of claim 15, wherein said analyzing is based on defined in relations with change of lenses.

* * * * *